(12) United States Patent  
Nakamura et al.

(10) Patent No.: US 8,160,366 B2  
(45) Date of Patent: Apr. 17, 2012

(54) OBJECT RECOGNITION DEVICE, OBJECT RECOGNITION METHOD, PROGRAM FOR OBJECT RECOGNITION METHOD, AND RECORDING MEDIUM HAVING RECORDED THEREON PROGRAM FOR OBJECT RECOGNITION METHOD

(75) Inventors: Akira Nakamura, Kanagawa (JP); Yoshiaki Iwai, Tokyo (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 12/488,099

(22) Filed: Jun. 19, 2009

(65) Prior Publication Data

US 2009/0316990 A1 Dec. 24, 2009

(30) Foreign Application Priority Data

Jun. 20, 2008 (JP) ................ P2008-161437  
Nov. 26, 2008 (JP) ................ P2008-300506

(51) Int. Cl.  
*G06K 9/46* (2006.01)  
*H04N 5/225* (2006.01)

(52) U.S. Cl. ........................ 382/190; 348/169

(58) Field of Classification Search ............... 382/100, 382/164, 171, 173, 177, 179, 190, 199, 201, 382/218; 702/190, 193; 704/221, 243, 247, 704/231; 705/7.33; 348/94, 169, 170, 171, 348/172, 208.14

See application file for complete search history.

(56) References Cited

U.S. PATENT DOCUMENTS

| | | | |
|---|---|---|---|
| 7,024,030 B1 * | 4/2006 | Kakiuchi et al. | 382/135 |
| 7,860,344 B1 * | 12/2010 | Fitzpatrick et al. | 382/291 |
| 2005/8021381 | | 9/2005 | Suzuki et al. |
| 2007/0269107 A1 | 11/2007 | Iwai et al. | |

FOREIGN PATENT DOCUMENTS

| | | |
|---|---|---|
| JP | 2004-326693 | 11/2004 |
| JP | 2005-208740 | 8/2005 |
| JP | 2008-77626 | 4/2008 |

* cited by examiner

*Primary Examiner* — Abolfazl Tabatabai  
(74) *Attorney, Agent, or Firm* — Finnegan, Henderson, Farabow, Garrett & Dunner, L.L.P.

(57) ABSTRACT

An object recognition device includes: a model image processing unit having a feature point set decision unit setting a feature point set in a model image, and detecting the feature quantity of the feature point set, and a segmentation unit segmenting the model image; a processing-target image processing unit having a feature point setting unit setting a feature point in a processing-target image and detecting the feature quantity of the feature point; a matching unit comparing the feature quantities of the feature points set in the model image and in the processing-target image so as to detect the feature point corresponding to the feature point set, and executes a matching; and a determination unit determining the processing result in the matching unit so as to determine presence/absence of a model object in the processing-target image.

24 Claims, 26 Drawing Sheets

FIG.15

| -1 | 0 | +1 |
|----|---|----|
| -2 | 0 | +2 |
| -1 | 0 | +1 |

FIG.16

| +1 | +2 | +1 |
|----|----|----|
| 0  | 0  | 0  |
| -1 | -2 | -1 |

DIFFERENCE OF REFERENCE AXIS DIRECTION OF POINT OF INTEREST
POSITION CORRECTION OF SUPPORT POINT

MATCHING OF SUPPORT POINT

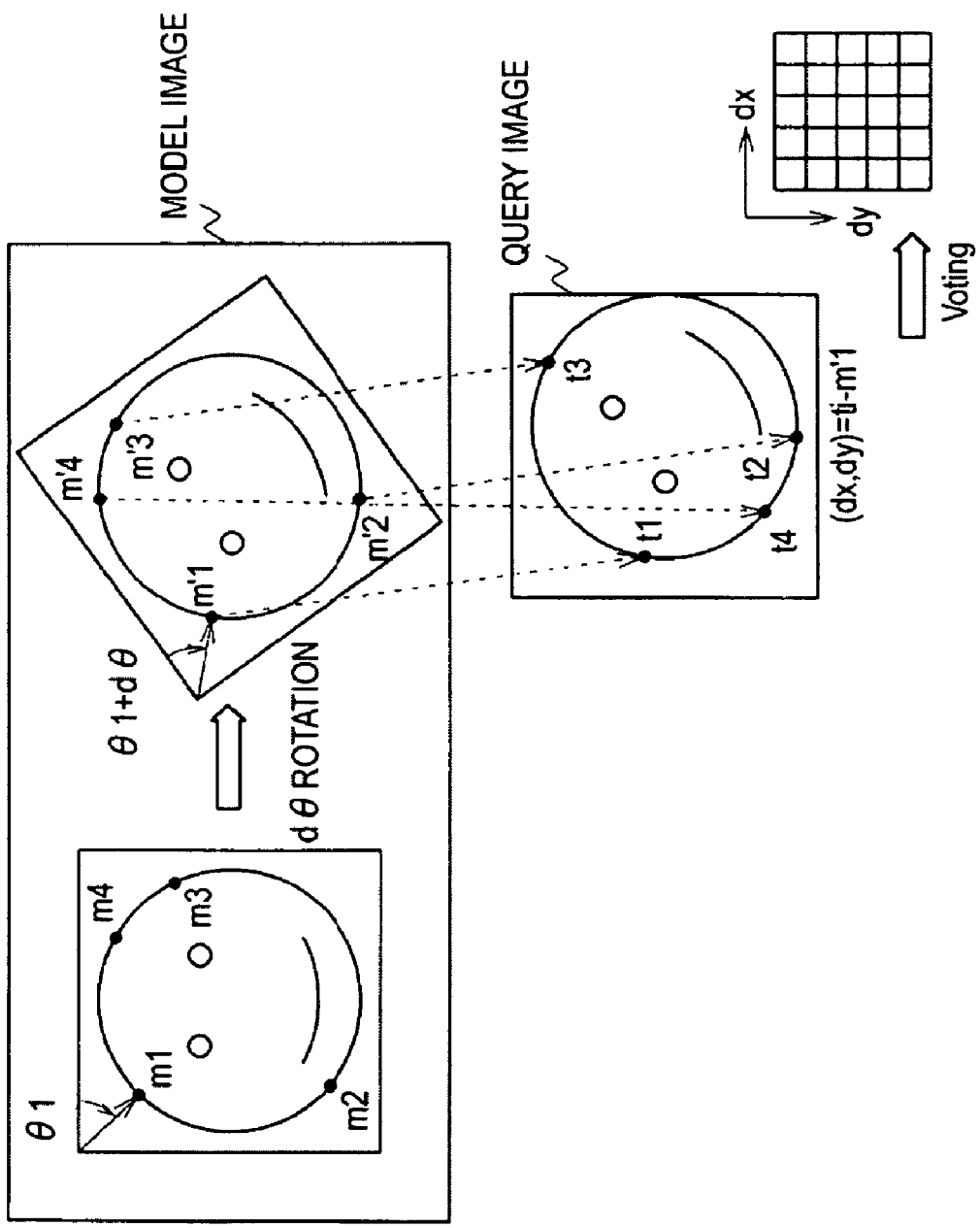

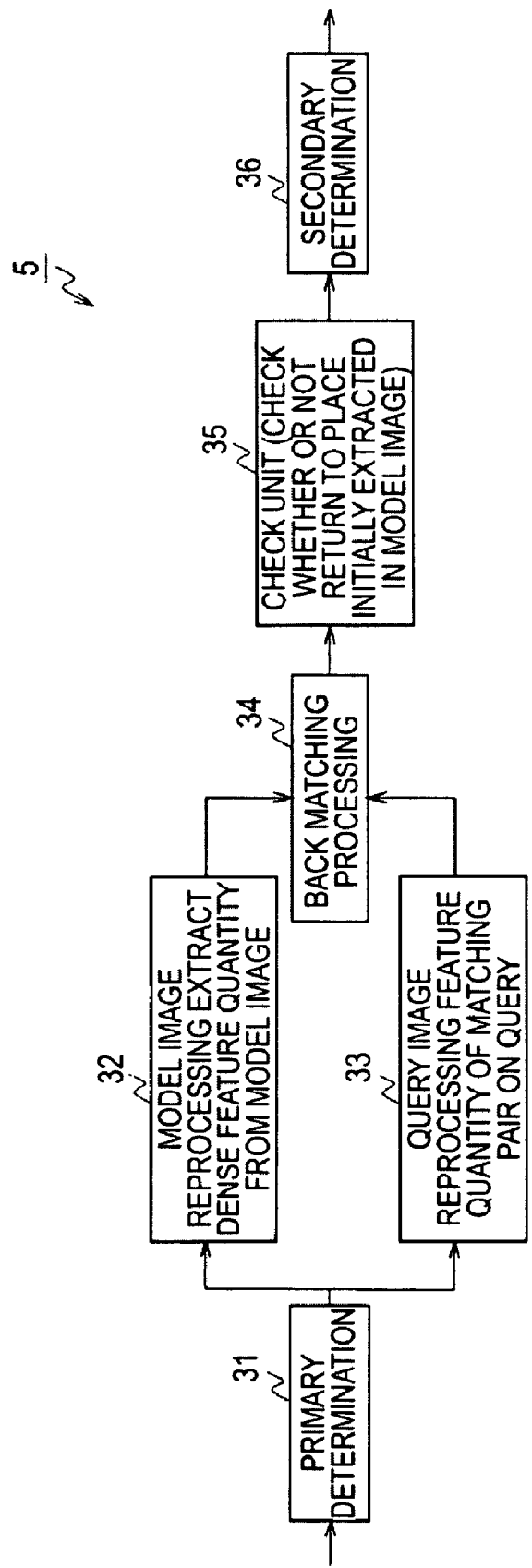

OBJECT RECOGNITION DEVICE, OBJECT RECOGNITION METHOD, PROGRAM FOR OBJECT RECOGNITION METHOD, AND RECORDING MEDIUM HAVING RECORDED THEREON PROGRAM FOR OBJECT RECOGNITION METHOD

BACKGROUND OF THE INVENTION

1. Field of the Invention

The present invention relates to an object recognition device, an object recognition method, a program for an object recognition method, and a recording medium having recorded thereon a program for an object recognition method. The present invention can be applied to when a still image of a specific subject is searched from among multiple still images recorded in a database. The present invention has an advantage of suppressing accuracy deterioration even in a model image with a background by segmenting a model image or a processing-target image and setting a base point and a corresponding support point in the same segment.

2. Description of the Related Art

In recent years, an electronic still camera or the like detects a desired object to be recognized (hereinafter, called a model object) from a processing-target image by object recognition through template matching. The object recognition through template matching may not sufficiently address when a model object is partially hidden, when the direction of a model object changes, when illumination changes, or the like.

With respect to such object recognition, JP-A-2004-326693 suggests a method that recognizes an object by matching based on the local feature quantity of the model object. According to the method described in JP-A-2004-326693, deterioration in detection accuracy due to a change in illumination can be reduced, and robust object recognition can be made. In this method, however, if the number of texture components in the model object is small, accuracy may be deteriorated.

JP-A-2008-077626 suggests a method that recognizes an object by matching based on a base point within a local area in an edge image of a model object and a support point supporting the base point.

According to the method described in JP-A-2008-077626, as shown in FIGS. 36A and 36B, which show the relationship between a model image M1 and a processing-target image L indicated by an arrow A, when no texture component is present in a model object MO, even if the model object MO is hidden in the processing-target image L, accuracy deterioration can be prevented. The model image is a processing reference image with a model object.

SUMMARY OF THE INVENTION

When such object recognition is applied to various applications, as shown in FIG. 36C, a background may be expected to be caught in a model image. In this case, with respect to object recognition using a model image M2, as indicated by an arrow B, a model object MO in the model image M2 with a background is detected from the processing-target image L.

However, in the related art object recognition, when a background is caught in a model image, accuracy is significantly deteriorated.

There is a need for an object recognition device and an object recognition method, which can suppress accuracy deterioration even if a background is caught in a model image, a program for an object recognition method, and a recording medium having recorded thereon a program for an object recognition method.

According to an embodiment of the invention, an object recognition device includes a model image processing unit processing a model image, a processing-target image processing unit processing a processing-target image, a matching unit matching the processing results in the model image processing unit and the processing-target image processing unit, and a determination unit determining the processing result in the matching unit so as to determine presence/absence of a model object in the processing-target image. The model image processing unit has a feature point set decision unit setting a feature point set including a base point and a support point supporting the base point in the model image, and detecting the feature quantity of the feature point set. The processing-target image processing unit has a feature point setting unit setting a feature point in the processing-target image and detecting the feature quantity of the feature point. The matching unit compares the feature quantity of the feature point set in the model image with the feature quantity of the feature point in the processing-target image so as to detect the feature point corresponding to the feature point set, and executes the matching. The model image processing unit has a segmentation unit segmenting the model image. The feature point set decision unit sets the base point and the corresponding support point in the same segment for each segment of the model image so as to set the feature point set.

According to another embodiment of the invention, an object recognition device includes a model image processing unit processing a model image, a processing-target image processing unit processing a processing-target image, a matching unit matching the processing results in the model image processing unit and the processing-target image processing unit, and a determination unit determining the processing result in the matching unit so as to determine presence/absence of a model object in the processing-target image. The processing-target image processing unit has a feature point set decision unit setting a feature point set including a base point and a support point supporting the base point in the processing-target image, and detecting the feature quantity of the feature point set. The model image processing unit has a feature point setting unit setting a feature point in the model image and detecting the feature quantity of the feature point. The matching unit compares the feature quantity of the feature point set in the processing-target image with the feature quantity of the feature point in the model image so as to detect the feature point corresponding to the feature point set, and executes the matching. The processing-target image processing unit has a segmentation unit segmenting the processing-target image. The feature point set decision unit sets the base point and the corresponding support point in the same segment for each segment of the processing-target image so as to set the feature point set.

According to yet another embodiment of the invention, an object recognition method includes the steps of processing a model image, processing a processing-target image, matching the processing results in the step of processing the model image and the step of processing the processing-target image, and determining the processing result in the step of matching so as to determine presence/absence of a model object in the processing-target image. The step of processing the model image has a substep of setting a feature point set including a base point and a support point supporting the base point in the model image, and detecting the feature quantity of the feature point set, thereby deciding the feature point set. The step of processing the processing-target image has a substep of setting a feature point in the processing-target image and detecting the feature quantity of the feature point. In the step of matching, the feature point corresponding to the feature point set is detected by comparison of the feature quantity of the feature point set in the model image with the feature quantity of the feature point in the processing-target image, and the matching is executed. The step of processing the model image has a substep of segmenting the model image. In the step of deciding the feature point set, the base point and the corresponding support point are set in the same segment for each segment of the model image so as to set the feature point set.

According to yet another embodiment of the invention, an object recognition method includes the steps of processing a model image, processing a processing-target image, matching the processing results in the step of processing the model image and the step of processing the processing-target image, and determining the processing result in the step of matching so as to determine presence/absence of a model object in the processing-target image. The step of processing the processing-target image has a substep of setting a feature point set including a base point and a support point supporting the base point in the processing-target image, and detecting the feature quantity of the feature point set, thereby deciding the feature point set. The step of processing the model image has a substep of setting a feature point in the model image and detecting the feature quantity of the feature point. In the step of matching, the feature point corresponding to the feature point set is detected by comparison of the feature quantity of the feature point set in the processing-target image and the feature quantity of the feature point in the model image, and the matching is executed. The step of processing the processing-target image has a substep of segmenting the processing-target image. In the step of deciding the feature point set, the base point and the corresponding support point are set in the same segment for each segment of the processing-target image so as to set the feature point set.

According to yet another embodiment of the invention, there is provided a program for an object recognition method that is executable by a computer. The program includes the steps of processing a model image, processing a processing-target image, matching the processing results in the step of processing the model image and the step of processing the processing-target image, and determining the processing result in the step of matching so as to determine presence/absence of a model object in the processing-target image. The step of processing the model image has a substep of setting a feature point set including a base point and a support point supporting the base point in the model image, and detecting the feature quantity of the feature point set, thereby deciding the feature point set. The step of processing the processing-target image has a substep of setting a feature point in the processing-target image and detecting the feature quantity of the feature point. In the step of matching, the feature point corresponding to the feature point set is detected by comparison of the feature quantity of the feature point set in the model image with the feature quantity of the feature point in the processing-target image, and the matching is executed. The step of processing the model image has a substep of segmenting the model image. In the step of deciding the feature point set, the base point and the corresponding support point are set in the same segment for each segment of the model image so as to set the feature point set.

According to yet another embodiment of the invention, there is provided a program for an object recognition method that is executable by a computer. The program includes the steps of processing a model image, processing a processing-target image, matching the processing results in the step of processing the model image and the step of processing the processing-target image, and determining the processing result in the step of matching so as to determine presence/absence of a model object in the processing-target image. The step of processing the processing-target image has a substep of setting a feature point set including a base point and a support point supporting the base point in the processing-target image, and detecting the feature quantity of the feature point set, thereby deciding the feature point set. The step of processing the model image has a substep of setting a feature point in the model image and detecting the feature quantity of the feature point. In the step of matching, the feature point corresponding to the feature point set is detected by comparison of the feature quantity of the feature point set in the processing-target image and the feature quantity of the feature point in the model image, and the matching is executed. The step of processing the processing-target image has a substep of segmenting the processing-target image. In the step of deciding the feature point set, the base point and the corresponding support point are set in the same segment for each segment of the processing-target image so as to set the feature point set.

According to yet another embodiment of the invention, there is provided a recording medium having recorded thereon a program for an object recognition method, which is executable by a computer. The program includes the steps of processing a model image, processing a processing-target image, matching the processing results in the step of processing the model image and the step of processing the processing-target image, and determining the processing result in the step of matching so as to determine presence/absence of a model object in the processing-target image. The step of processing the model image has a substep of setting a feature point set including a base point and a support point supporting the base point in the model image, and detecting the feature quantity of the feature point set, thereby deciding the feature point set. The step of processing the processing-target image has a substep of setting a feature point in the processing-target image and detecting the feature quantity of the feature point. In the step of matching, the feature point corresponding to the feature point set is detected by comparison of the feature quantity of the feature point set in the model image with the feature quantity of the feature point in the processing-target image, and the matching is executed. The step of processing the model image has a substep of segmenting the model image. In the step of deciding the feature point set, the base point and the corresponding support point are set in the same segment for each segment of the model image so as to set the feature point set.

According to yet another embodiment of the invention, there is provided a recording medium having recorded thereon a program for an object recognition method, which is executable by a computer. The program includes the steps of processing a model image, processing a processing-target image, matching the processing results in the step of processing the model image and the step of processing the processing-target image, and determining the processing result in the step of matching so as to determine presence/absence of a model object in the processing-target image. The step of processing the processing-target image has a substep of setting a feature point set including a base point and a support point supporting the base point in the processing-target image, and detecting the feature quantity of the feature point set, thereby deciding the feature point set. The step of processing the model image has a substep of setting a feature point in the model image and detecting the feature quantity of the feature point. In the step of matching, the feature point corresponding to the feature point set is detected by comparison of the feature quantity of the feature point set in the processing-target image and the feature quantity of the feature point in the model image, and the matching is executed. The step of processing the processing-target image has a substep of segmenting the processing-target image. In the step of deciding the feature point set, the base point and the corresponding support point are set in the same segment for each segment of the processing-target image so as to set the feature point set.

According to the embodiments of the invention, a feature point set including a base point and a support point can be set in a model image, and matching can be executed on the basis of the local feature quantity of the feature point set. Therefore, even if the number of texture components in the model object is small, robust recognition can be performed. In addition, since the base point and the corresponding support point are set in the same segment so as to set the feature point set, the base point and the support point can be prevented from being set across a background and a model object. Therefore, recognition accuracy can be prevented from being deteriorated due to the base point and the support point set across the background and the model object.

According to the embodiments of the invention, a feature point set including a base point and a support point can be set in a processing-target image, and matching can be executed on the basis of the local feature quantity of the feature point set. Therefore, even if the number of texture components in a model object of the processing-target image is small, robust recognition can be performed. In addition, since the base point and the corresponding support point are set in the same segment so as to set the feature point set, the base point and the support point can be prevented from being set across a background and a model object. Therefore, recognition accuracy can be prevented from being deteriorated due to the base point and the support point set across the background and the model object.

According to the embodiments of the invention, even if a background is caught in a model image, accuracy deterioration can be suppressed.

BRIEF DESCRIPTION OF THE DRAWINGS

FIG. 15 is a chart showing a horizontal differential filter;

FIG. 16 is a chart showing a vertical differential filter;

FIG. 20 is a schematic view illustrating removal of an outlier;

FIG. 21 is a block diagram showing a determination unit;

DESCRIPTION OF THE PREFERRED EMBODIMENTS

Embodiments of the invention will now be described in detail with reference to the drawings.
1. First Embodiment
2. Second Embodiment
3. Third Embodiment
4. Fourth Embodiment
5. Fifth Embodiment
6. Modifications First Embodiment

[Overall Configuration]

Figure 2:
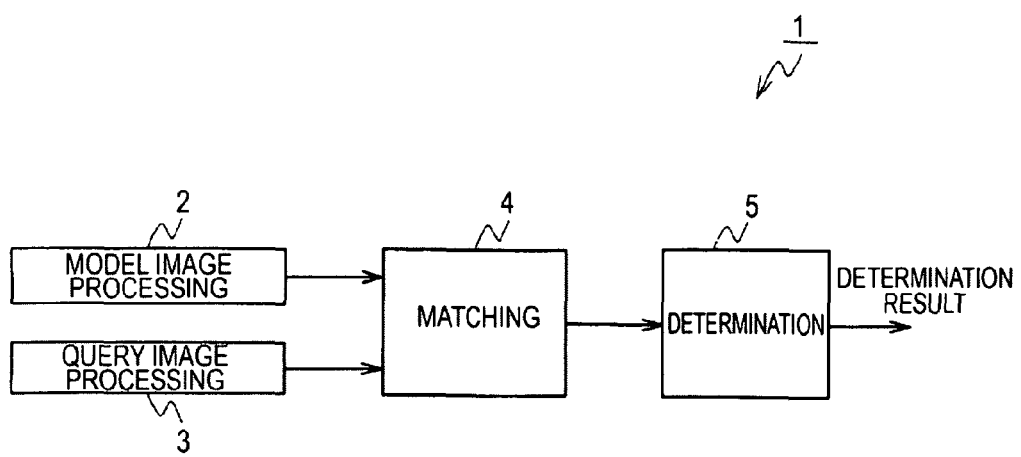
FIG. 2 is a block diagram showing the object recognition device according to the first embodiment of the invention.

FIG. 2 is a functional block diagram of an object recognition device according to a first embodiment of the invention. An object recognition device 1 accepts selection of a model image from among natural images including multiple still images recorded in a database by a user's operation. The object recognition device 1 sequentially sets natural images within a search range specified by the user as a processing-target image (hereinafter, called query image), and detect a model object in a model image from the processing-target image.

The object recognition device 1 is a computer having a recording device which can store multiple natural images. Functional blocks shown in FIG. 2 are implemented by execution of an object recognition program by a central processing unit provided in the computer. The object recognition program is installed on the object recognition device 1 beforehand. Alternatively, the object recognition program may be provided through various recording mediums, such as an optical disk, a magnetic disk, a memory card, and the like, or may be provided through a network, such as Internet or the like.

In the object recognition device 1, a model image processing unit 2 and a query image processing unit 3 process a model image and a query image, and output the processing results, respectively. A matching unit 4 executes matching on the basis of the processing results in the model image processing unit 2 and the query image processing unit 3. A determination unit 5 outputs a determination result on the basis of the processing result in the matching unit 4.

[Model Image Processing]

Figure 1:
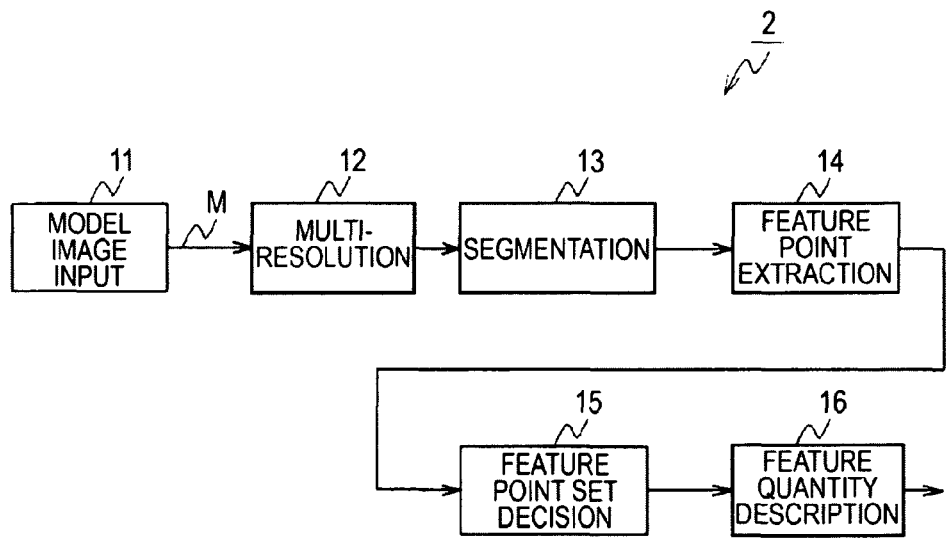
FIG. 1 is a block diagram showing the configuration of a model image processing unit in an object recognition device according to a first embodiment of the invention.

FIG. 1 is a block diagram showing the model image processing unit 2 in detail. In the model image processing unit 2, a model image input unit 11 accepts selection of a model image M from among multiple natural image recorded in recording means (not shown) by a user's operation.

A multi-resolution unit 12 varies the resolution of the model image M to generate a plural number of model images in which the number of samples changes sequentially and gradually. Therefore, the multi-resolution unit 12 generates model images of a pyramid structure with the image size of an input model image expanded and reduced in accordance with a change in the scale of the model object in the processing-target image. The resolution conversion is executed by filtering using a predetermined filter.

A segmentation unit 13 segments the model images with different resolutions generated by the multi-resolution unit 12. Specifically, the segmentation unit 13 segments the model images by color segmentation, in which segmentation is executed on the basis of colors. The color segmentation may be executed by various methods, but in this embodiment, it is executed by a method disclosed in CVPR1999 Y. Deng, B. S. Manjunath, and H. Shin, Color Image Segmentation.

The segmentation is not limited to the color segmentation, but it may be executed by various methods. Therefore, the model images may be segmented on the basis of luminance levels, frequency components, or a combination of them. With respect to the segmentation based on the luminance levels or the frequency components, segmentation is made by determination of the luminance levels or the frequency components of respective pixels on the basis of a plural number of determination reference values.

With respect to the segmentation, the segmentation unit 13 sets a segment boundary with a width corresponding to a predetermined number of pixels (for example, one-pixel width) between segments.

Figure 3:
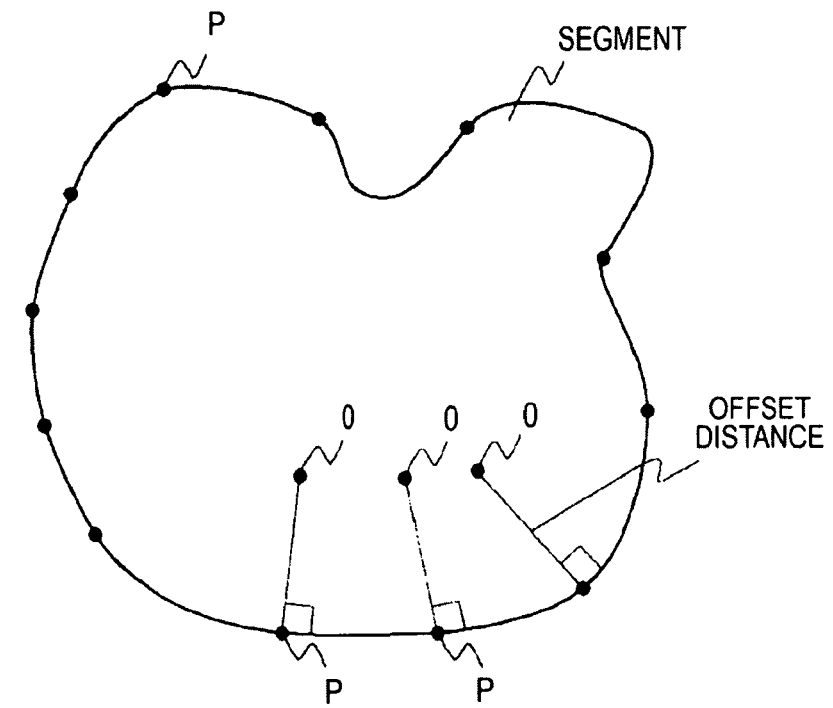
FIG. 3 is a schematic view illustrating setting of a feature quantity description center.

A feature point extraction unit 14 sequentially sets feature points at the segment boundary for each segment set in the model image of each resolution, and detects the feature quantity of each feature point. Specifically, as shown in FIG. 3, the feature point extraction unit 14 sets feature points P with predetermined intervals at the segment boundary for each segment. In this case, in the object recognition device 1, as the area and the peripheral length of the segment decrease, the number of feature points to be set in one segment is reduced, and thus the number of feature point sets described below is reduced. Therefore, in the object recognition device 1, a subsequent useless processing can be omitted while accuracy deterioration can be suppressed, and as a result, the entire processing can be simplified.

A predetermined number of feature points may be randomly set at the segment boundary, rather than that the feature points P are set with predetermined intervals. In this case, as the area and the peripheral length of the segment decrease, the number of feature points to be randomly set is reduced, and thus the number of feature point sets is reduced. Therefore, a subsequent useless processing can be omitted while accuracy deterioration can be suppressed, and as a result, the entire processing can be simplified.

The feature point extraction unit 14 sets a feature quantity description center O within the segment at an offset distance according to a feature quantity description radius from the corresponding feature point P on the normal of the segment boundary for each feature point P. The feature quantity description center O is the reference position that defines a local area of the corresponding feature point. In this embodiment, a circular area centering on the feature quantity description center O is set as the local area of the corresponding feature point, and the feature quantity of the corresponding feature point is calculated from the circular local area.

The feature quantity description radius is the radius of the circular area. In this embodiment, the feature quantity description radius is set to a predetermined standard value, but it may be set in accordance with segment boundary information for each model image, for each segment, and/or for each part of the segment. This setting is executed by calculating an evaluation value for evaluation of segment boundary information included in a predetermined area for each part at the segment boundary and setting the radius on the basis of the evaluation value such that the segment boundary information becomes so small as to be significant for matching.

The offset distance is set to a value smaller than the feature quantity description radius. In this embodiment, the offset distance is set to a value that is ⅔ of the feature quantity description radius.

Figure 4:
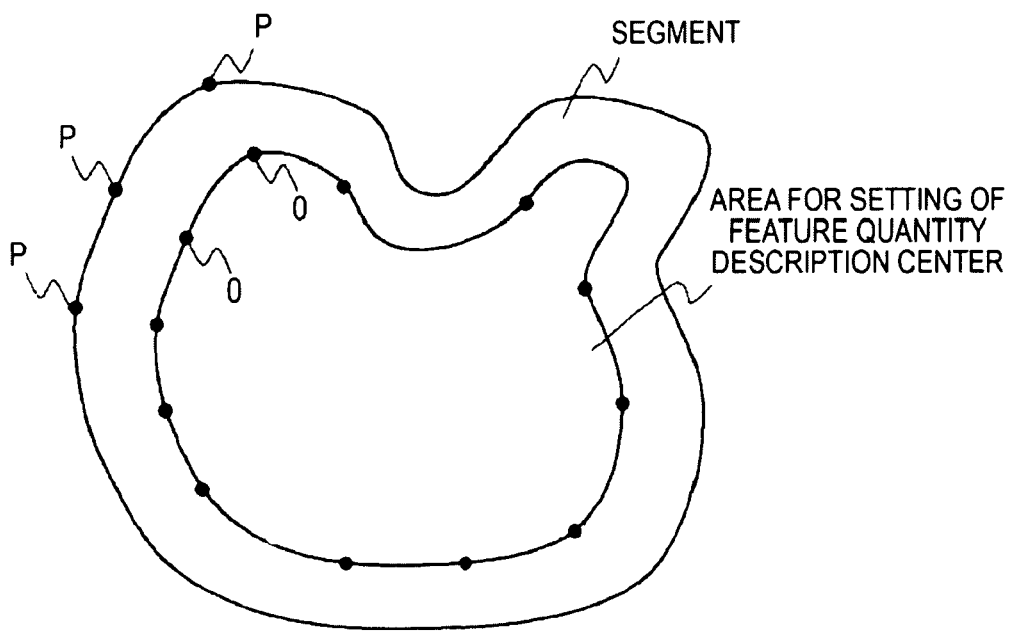
FIG. 4 is a schematic view illustrating an area for setting of a feature quantity description center.

The feature quantity description center O is first set, and then the corresponding feature point P may be set, rather than that the feature point P is first set, and then the feature quantity description center O is set. In this case, as shown in FIG. 4, which is provided for comparison with FIG. 3, each segment is shrunk by the offset distance, and an area for setting of the feature quantity description center is formed with the outside of the segment corresponding to the offset distance removed. Next, the feature quantity description centers O are set on the outer circumference of the area for setting of the feature quantity description center with predetermined intervals. Therefore, as the area and peripheral length of the segment decrease, the number of feature quantity description centers O to be set in one segment is reduced, and the number of corresponding feature points is also reduced. For this reason, the number of feature point sets to be set in one segment is also reduced. As a result, a subsequent useless processing can be omitted while accuracy deterioration can be suppressed, and thus the entire processing can be simplified.

A predetermined number of feature quantity description centers O may be randomly set, rather than that the feature quantity description centers O are set with predetermined intervals. In this case, as the area and peripheral length of the segment decrease, the number of feature points to be set is reduced. As a result, a subsequent useless processing can be omitted while accuracy deterioration can be suppressed, and thus the processing can be simplified.

Next, the normal of the contour of the area for setting is set from each feature quantity description center outward of the area for setting, and the feature point P is set at the intersection between the normal and the segment boundary.

A point at the segment boundary closest to each feature quantity description center may be set as the feature point P, rather than that the feature point P is set at the intersection between the normal and the segment boundary. In this case, if necessary, the feature quantity description center O may be reset from each feature point.

Figure 5:
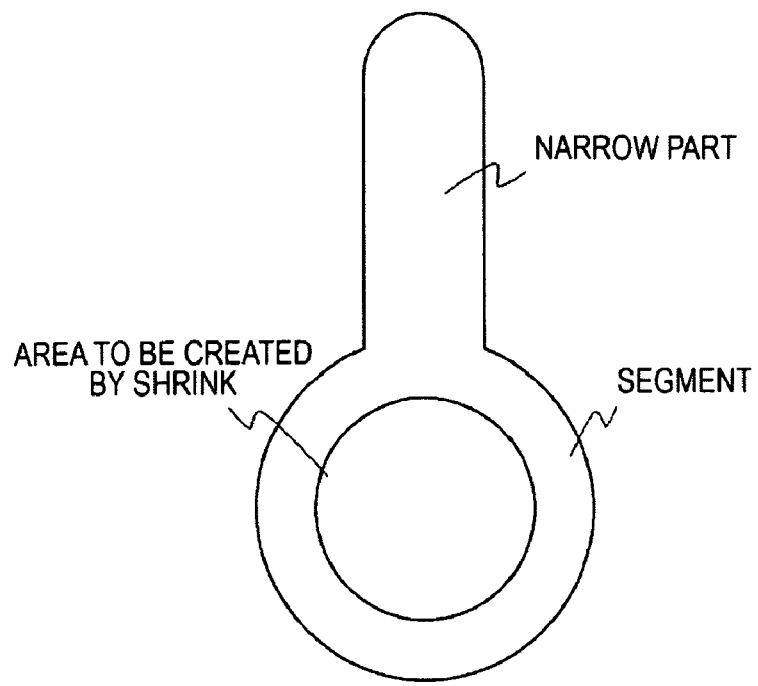
FIG. 5 is a schematic view illustrating shrink.

As shown in FIG. 5, in the case of a segment with a narrow part having a width two times larger than the offset distance, the narrow part is removed by shrink when the area for setting of the feature quantity description center is set, the area for setting of the feature quantity description center cannot be set at the narrow part. As a result, the feature point P cannot be set at the narrow part.

Figure 6:
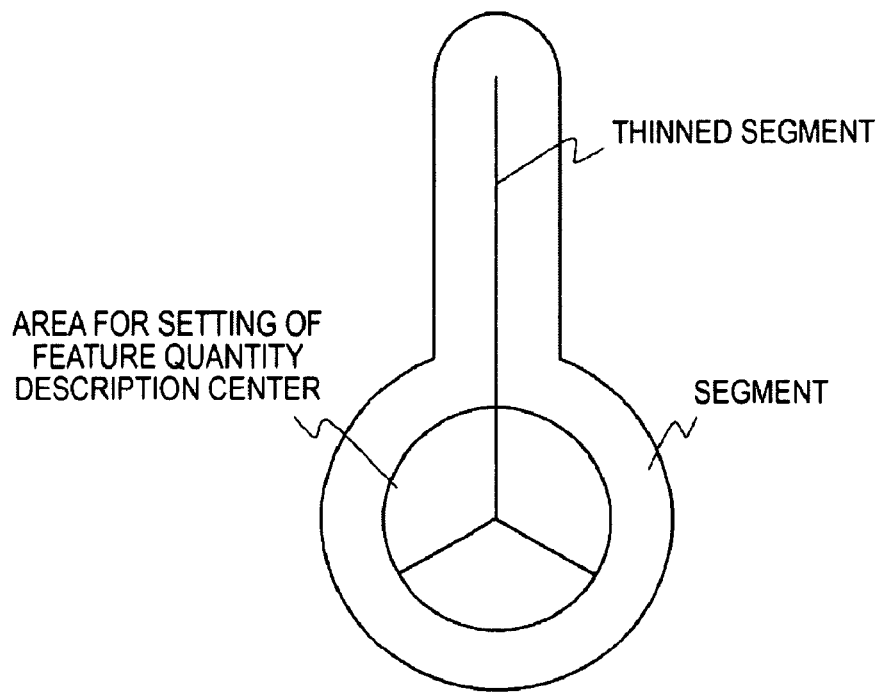
FIG. 6 is a schematic view illustrating thinning.

As shown in FIG. 6, which is provided for comparison with FIG. 5, a segment may be thinned, and an area to be created by thinning may be superimposed on an area to be formed by shrink to define the area for setting of the feature quantity description center. In this case, with respect to at least the narrow part, if necessary, the feature point P is set, and the feature quantity description center O is then reset.

The reason why the feature quantity description center o is shifted from the position of the feature point inward of the segment by the offset distance is to reduce the influence of the background at the time of matching and to improve matching accuracy when the segment is a segment of a model object, and the boundary of the segment is the boundary between the segment and the background. Therefore, when sufficient matching accuracy for practical use can be ensured, the feature quantity description center O may be set at the feature point P.

The feature point extraction unit 14 detects the feature quantity of each feature point. The feature point extraction unit 14 defines a circular area with the feature quantity description radius centering on the feature quantity description center O as the local area of the corresponding feature point. The feature point extraction unit 14 sets the feature quantity to be detected in the local area as the feature quantity of the corresponding feature point.

The feature point extraction unit 14 detects the feature quantity on the basis of segment boundary information included in the local area, such that, even if the number of texture components in the model object is small, sufficient matching accuracy can be ensured. If sufficient matching accuracy for practical use can be ensured, for example, when the feature quantity is detected on the basis of edge information rather than segment boundary information, when the feature quantity is detected on the basis of the frequency component of the local area, or the like, the feature quantity that is detected by various methods can be widely applied.

Figure 7:
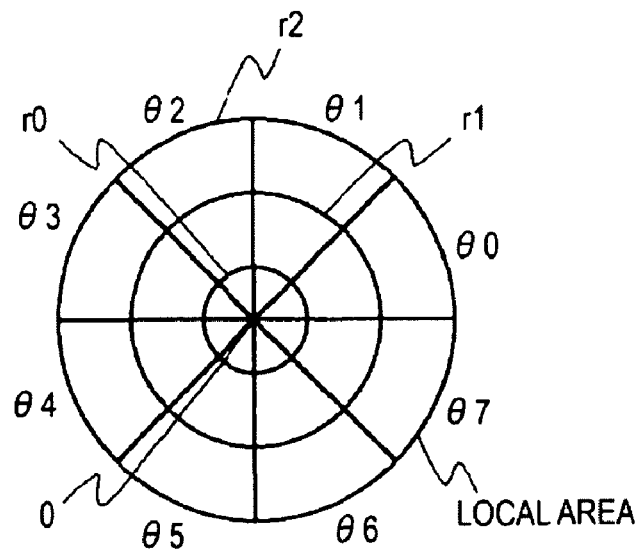
FIG. 7 is a schematic view illustrating a minute area for feature quantity detection.

Specifically, the feature point extraction unit 14 totals segment boundary information for minute areas, which are divided from the local area, and detects the feature quantity. In this embodiment, as shown in FIG. 7, the local area is divided in a radial direction and a circumferential direction to form minute areas. FIG. 7 shows an example where the local area is divided into three equal parts in the radial direction and into eight equal parts in the circumferential direction. The number of parts to be divided may be set in various ways, as occasion demands. When sufficient matching accuracy for practical use can be ensured, the local area may be divided in either the radial direction or the circumferential direction to form minute areas.

Figure 8:
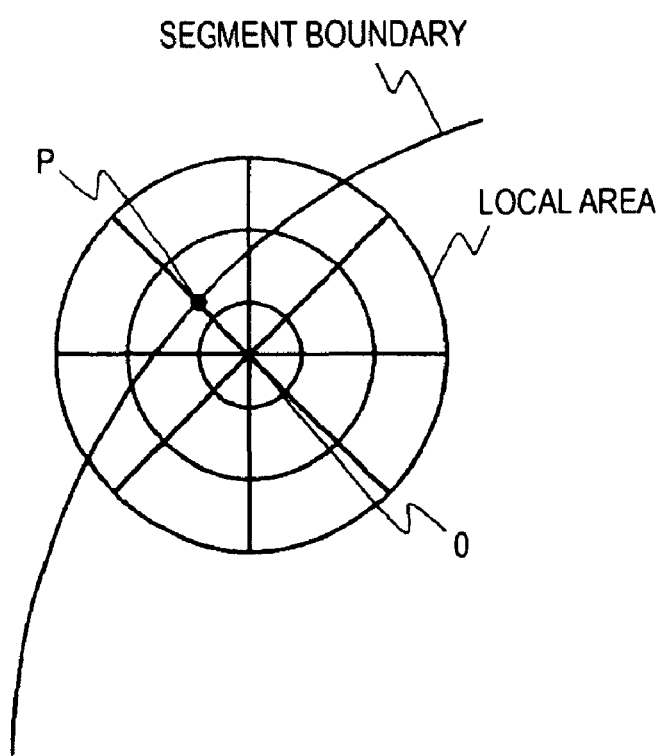
FIG. 8 is a schematic view illustrating feature quantity detection.
Figure 9:
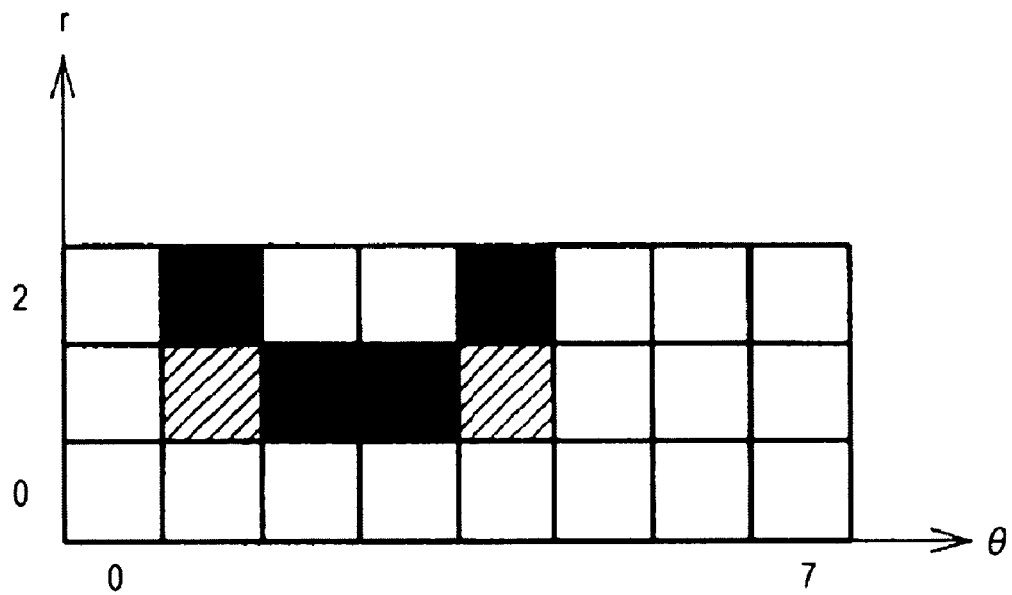
FIG. 9 is a schematic view illustrating a histogram.

As shown in FIGS. 8 and 9, which are provided for comparison with FIG. 7, the feature point extraction unit 14 translates the number of segment boundary points into a histogram by the minute areas, and creates a two-dimensional histogram (FIG. 9) based on an angle θ when viewed from the feature quantity description center O and a distance r. The feature point extraction unit 14 detects the feature quantity of each feature point by the two-dimensional histogram. The segment boundary points are continuous pixels at the segment boundary or pixels with predetermined pitches at the segment boundary. In FIG. 9, a minute area with the maximum degree of distribution is represented by black, a minute area with a high degree of distribution is hatched, and a minute area with a degree of distribution of 0 is represented by white.

In this case, the feature quantity of each feature point is calculated by using positional information of the segment boundary points as segment boundary information. However, the detection of the feature quantity using the segment boundary information is not limited to the above-described method. For example, the feature quantity of each feature point may be calculated by using positional information of the segment boundary points and the parameters defining the segment boundary. In this case, the feature quantity can be detected by totaling of the parameters at the segment boundary points in each minute area and translation of the parameters into a histogram, rather than the number of segment boundary points. As the parameters, for example, the gradients of the pixel values in a direction vertically across the segment boundary may be used. When the feature quantity is detected using edge information, the points on the edge may be totaled for each area or the parameters, such as gradients or the like, defining the edge are totaled for each area, and used in detection of the feature quantity.

Figure 10:
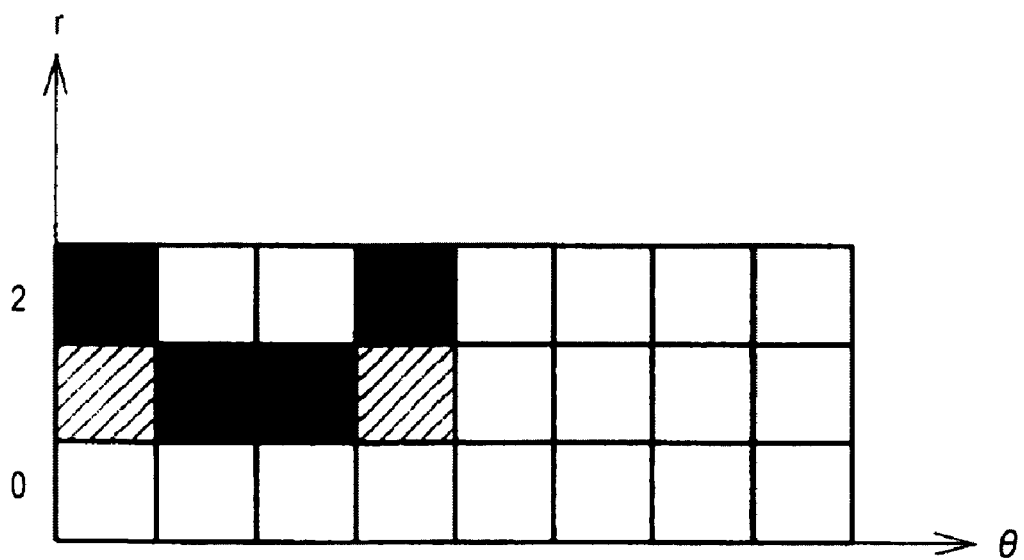
FIG. 10 is a schematic view illustrating rotation normalization.

In order to realize rotation invariance of the extracted feature quantity, the feature point extraction unit 14 extracts a reference axis direction, and rotation normalization of the histogram is carried out. The feature point extraction unit 14 detects an angle corresponding to the maximum degree of distribution in the histogram and defines the direction of the angle as the reference axis direction. As shown in FIG. 10, which is provided for comparison with FIG. 9, the histogram is shifted by the angle in the circumferential direction, and the rotation normalization of the histogram is carried out such that the distribution starts from the angle corresponding to the maximum degree of distribution.

A feature point set decision unit 15 (FIG. 1) sets the feature point detected by the feature point extraction unit 14 as a base point, and a support point supporting the base point for each base point. In this way, the feature point set decision unit 15 creates a feature point set including a base point and a corresponding support point.

During this processing, the feature point set decision unit 15 sets a base point b and a support point s of each feature point set from the feature points in the same segment. In this way, in the object recognition device 1 of this embodiment, the feature point set is created so as not to across the model object and the background, and even if a background is caught in the model image, accuracy is prevented from being deteriorated due to the background.

Specifically, the feature point set decision unit 15 sets all the feature points detected by the feature point extraction unit 14 as base points. During the processing to set the base points, every predetermined number of feature points may be set as the base point, and the feature point extraction unit 14 may equally execute a processing to reduce the number of feature points to be set as the area and/or the peripheral length of the segment becomes small. Furthermore, only feature points that are significant for matching may be selectively set as the base points by feature quantity comparison.

Figure 11A:
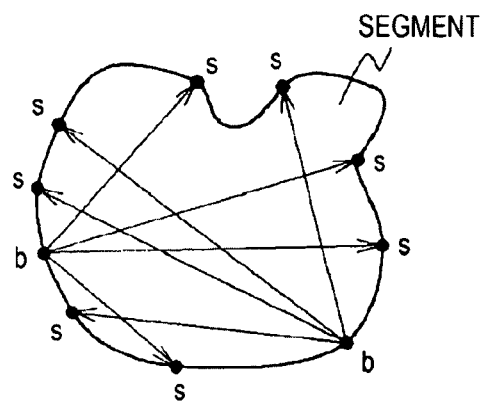
FIGS. 11A to 11C are schematic views illustrating a feature point set.
Figures 11B, 11C:
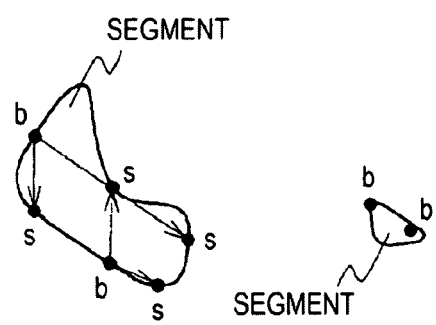

The feature point set decision unit 15 randomly selects, for each base point, S feature points from the remaining feature points of the segment where the base points are set, and sets the S feature points as the support points of the corresponding base point. During this processing, as shown in FIGS. 11A to 11C, the feature point set decision unit 15 sets the support points such that the number of support points decreases within the range of 0 to a predetermined number of support numbers as the area and peripheral length of the segment becomes small.

At a portion where the number of textures is large, the segment is thinned, and the sufficient identification capacity of the feature quantity can be ensured at this portion even if no support point is included in the feature point set or the number of support points in the feature point set is small. To the contrary, at a portion where the number of textures is small, one segment increases. At this portion, there is no information other than the segment boundary, and if a comparatively large number of support points are not provided in the feature point set, it is difficult to ensure the identification capacity of the feature quantity. In this way, if the support points are set within the range of 0 to a predetermined number of support points such that the number of support points decreases as the area and peripheral length of the segment becomes small, a subsequent useless processing can be omitted while sufficient accuracy can be ensured, and thus the entire processing can be simplified.

The feature point set decision unit 15 excludes feature points, which are off from the base point at a distance of a predetermined value or more, from the selection range of support points. Therefore, the object recognition device 1 prevents accuracy from being deteriorated due to occlusion (hiding).

The support points may be selected in various ways. For example, S feature points may be selected such that the angle from the base point to each support point becomes as wide as possible, and set as support points, rather than that S feature points are randomly selected and set as support points. Furthermore, only the feature points that are significant for matching may be selectively set as the support points by feature quantity comparison.

A feature quantity description unit 16 (FIG. 1) detects the geometric positional relationship between the base point and the corresponding support point for each feature point set, and describes the local area of the model object on the basis of the geometric positional relationship and the feature quantities of the base point and the corresponding support point.

Figure 12:
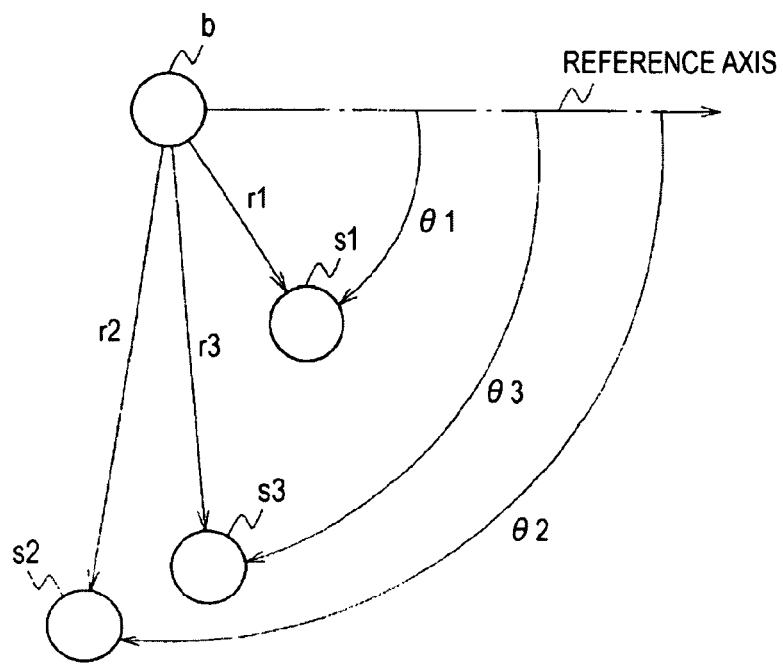
FIG. 12 is a schematic view illustrating the feature quantity of a feature point set.

As shown in FIG. 12, the feature quantity description unit 16 defines geometric positional relationship on the basis of relative positional information of support points s1 to s3 with respect to a base point b. Specifically, the feature quantity description unit 16 detects angles θ1 to θ3 from the base point b to the respective support points s1 to s3 with reference to the reference axis used for the rotation normalization at the base point b. The feature quantity description unit 16 detects distances r1 to r3 from the base point b to the respective support points s1 to s3. The feature quantity description unit 16 defines the geometric positional relationship on the basis of the angles θ1 to θ3 and the distances r1 to r3. The feature quantity description unit 16 outputs information about the geometric positional relationship and the feature quantities of the base point and the corresponding support point to the matching unit 4 as the feature quantity of the feature point set.

[Query Image Processing]

Figure 13:
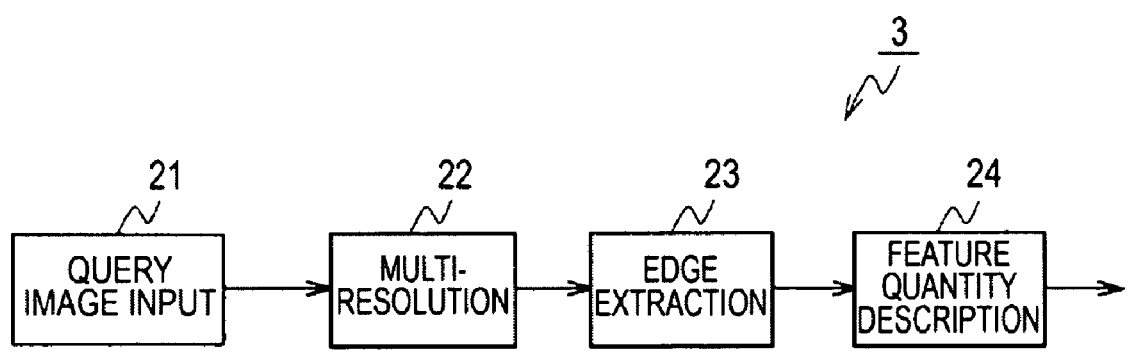
FIG. 13 is a block diagram showing a query image processing unit.

FIG. 13 is a block diagram showing the configuration of the query image processing unit 3 in detail. In the query image processing unit 3, a query image input unit 21 sequentially reads out and outputs image data of a query image from a recording medium (not shown). A multi-resolution unit 22 processes image data of the query image through the same processing in the multi-resolution unit 12 of the model image processing unit 2, and generates query images in a pyramid structure with the image size of an input query image expanded and reduced.

An edge extraction unit 23 generates edge images from the query images with different resolutions. A feature quantity description unit 24 sets the feature points in the respective edge images, and detects the feature quantity of each feature point so as to correspond to the feature quantities of the base point and the support point detected from the model image. Therefore, the processing in the edge extraction unit 23 and the feature quantity description unit 24 varies depending on the processing in the feature point extraction unit 14 of the model image processing unit 2. In the following description, a case where a processing to detect the feature quantity of each feature point in the model image is a processing to translate the number of segment boundary points into a histogram by the minute areas will be described.

The edge extraction unit 23 extracts an edge boundary with a width corresponding to a predetermined number of pixels (for example, one-pixel width) from the query image so as to correspond to the segment boundary in the model image, and generates the edge image. Similarly to the model image, segmentation may be executed, and the segment boundary, rather than the edge by the edge image, may be used in the subsequent processing.

Figure 14:
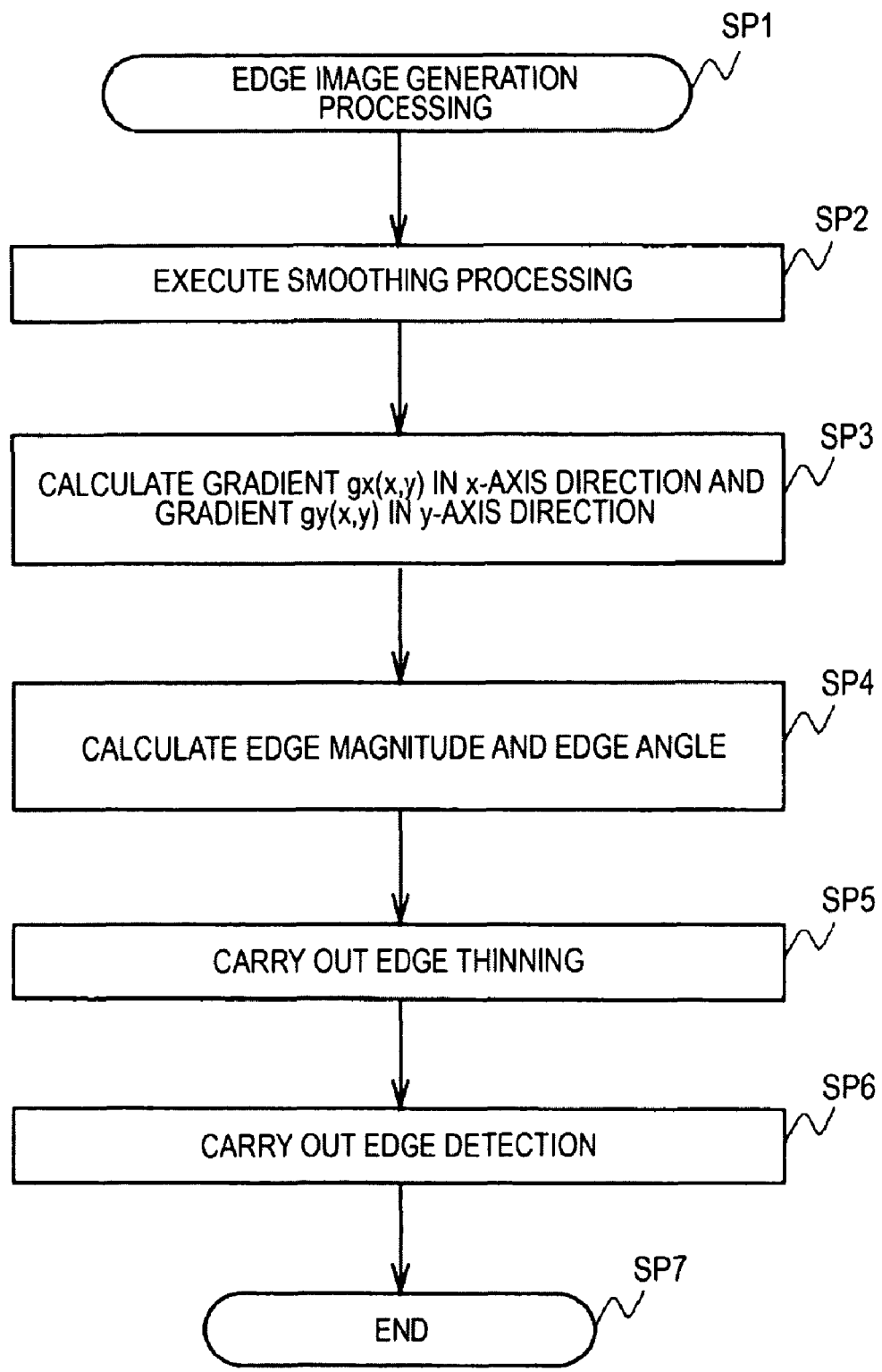
FIG. 14 is a flowchart showing an edge extraction processing.

FIG. 14 is a flowchart showing an edge image generation processing. If this processing sequence starts, the edge extraction unit 23 progresses from Step SP1 to Step SP2 to execute a smoothing processing for the query images having different resolutions and to reduce noise and fine texture components in the images. The smoothing processing may be executed by using various filters, and in this embodiment, it is executed by a convolution operation using a Gauss filter G(x,y), which is represented by Equation (1). For Equation (1), f(x,y) denotes the pixel value of a query image having the coordinate (x,y) in the horizontal direction and the vertical direction. The Gauss filter G(x,y) is represented by Equation (2). For Equation (2), σ is a parameter that sets a degree of smoothing.

$$g(x, y) = G(x, y) * f(x, y) \quad (1)$$

$$G(x, y) = \frac{1}{\sqrt{2\pi\sigma^2}} \exp\left[-\frac{x^2 + y^2}{2\sigma^2}\right] \quad (2)$$

In Step SP3, the edge extraction unit 23 calculates the gradient gx(x,y) in the horizontal direction and the gradient gy(x,y) in the vertical direction for each pixel of the smoothed query image. Specifically, the edge extraction unit 23 calculates the gradient gx(x,y) in the horizontal direction by applying a horizontal differential filter shown in FIG. 15. Similarly, the edge extraction unit 23 calculates the gradient gy(x,y) in the vertical direction by applying a vertical differential filter shown in FIG. 16. In this way, the edge extraction unit 23 creates a gradient image on the basis of the gradient gx(x,y) and the gradient gy(x,y).

In Step SP4, the edge extraction unit 23 executes the operations of Equations (3) and (4) using the gradients gy(x,y) and gx(x,y) calculated in Step SP3 to calculate an edge magnitude M(x,y) and an edge angle θ(x,y). In this way, the edge extraction unit 23 generates an intermediate-processed image with the edge magnitude M(x,y) and the edge angle θ(x,y) set for each pixel.

$$M(x, y) = \sqrt{gx(x, y)^2 + gy(x, y)^2} \quad (3)$$

$$\theta(x, y) = \tan^{-1}\left[\frac{gy(x, y)}{gx(x, y)}\right] \quad (4)$$

In Step SP4, the edge extraction unit 23 thins the edge in the intermediate-processed image. In the intermediate-processed image based on the edge magnitude M(x,y), the edge is partially expressed by a width corresponding to a plural number of pixels. Therefore, the edge extraction unit 23 sets the edge width so as to correspond to the segment boundary in the model image processing unit 2.

Specifically, when the edge magnitude M(x, y) is not zero at the coordinate (x,y), the edge extraction unit 23 detects the edge magnitude M(x1,y1) of the coordinate (x1,y1) in the edge direction to be expressed by the edge angle θ(x,y) and the edge magnitude M(x2,y2) of the coordinate (x2,y2) in the opposite edge direction. The edge extraction unit 23 compares the edge magnitudes M(x,y), M(x1,y1), and M(x2,y2) with each other. When the edge magnitude M(x,y) is smaller than the edge magnitude M(x1,y1) or the edge magnitude M(x2,y2), the edge extraction unit 23 determines that the coordinate (x,y) is not the point on the edge, and sets the edge magnitude M(x,y) of the coordinate (x,y) to zero. Accordingly, the edge extraction unit 23 sequentially selects the pixels with the largest edge magnitude M(x,y) in a part of the intermediate-processed image by the edge magnitude M(x,y) where the pixels with the edge magnitude M(x,y) of not zero are continuous, and executes a thinning processing.

In Step SP6, the edge extraction unit 23 executes an edge detection processing from the thinned intermediate-processed image. The edge extraction unit 23 executes the edge detection processing on the basis of determination of the edge magnitude M(x,y) in the intermediated-processed image thinned through Step SP5 with reference to a threshold value. Specifically, the edge extraction unit 23 executes the edge detection processing by using the Canny edge filter. When edge detection is executed by using the Canny edge filter, the edge magnitude M(x,y) of the coordinate (x,y) is larger than a larger threshold value T high of two threshold values T high and T low, the coordinate (x,y) is set as the start point of edge search. When edge detection is executed by using the Canny edge filter, edge detection is executed by sequential search of the coordinate (x,y) with the edge magnitude M(x,y) larger than the remaining threshold value T low from the start point of edge search.

If edge detection is completed for the query images having all the resolutions, the edge extraction unit 23 progresses to Step SP7 and ends the processing sequence.

Figure 17:
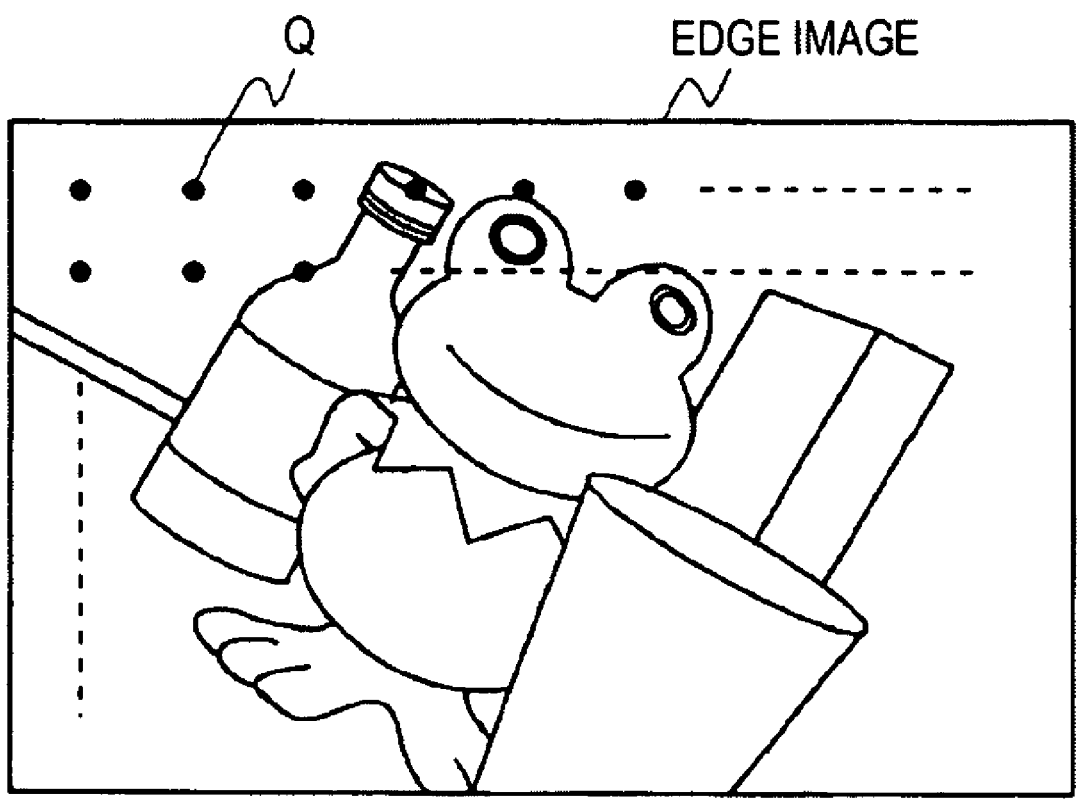
FIG. 17 is a schematic view illustrating feature point setting in a query image.

The feature quantity description unit 24 (FIG. 13) sets feature points densely in each of the edge images generated by the edge extraction unit 23. Specifically, the feature quantity description unit 24 sets all the pixels of each of the edge images as the feature points or feature points Q with pitches corresponding to a predetermined number of pixels in the horizontal direction and the vertical direction, as shown in FIG. 17. The feature quantity description unit 24 also sets the respective feature points Q as the feature quantity description center, creates the histogram by the minute areas in the same manner as the model image, executes the rotation normalization, and detects the feature quantity of each of the feature points.

In the model image, when the feature quantity of each of the feature point is calculated on the basis of the positional information of the segment boundary, the gradient of the pixel value in the direction vertically across the segment boundary, and the like, the values representing gradient strength are totaled for the respective minute areas, rather than the number of points on the edge and the number of points at the segment boundary, and the histogram is created.

If the feature quantity of each of the feature point is calculated in such a manner, the feature quantity description unit 24 selects only the feature points on the edge from among the feature points of the respective edge images, and sets the selected feature points as the feature points subject to the matching processing. In this way, the feature quantity description unit 24 reduces the amount of calculation in a subsequent processing.

After the feature points are set densely and the feature quantity of each of the feature points is detected, the feature points may be set on the edge, rather than the feature points subject to the matching processing are selected, and the feature quantity of each of the feature points may be detected. When a sufficient processing capacity for practical use is provided, all the feature points densely set may be set as the feature points subject to the matching processing.

[Matching Processing]

Figure 18:
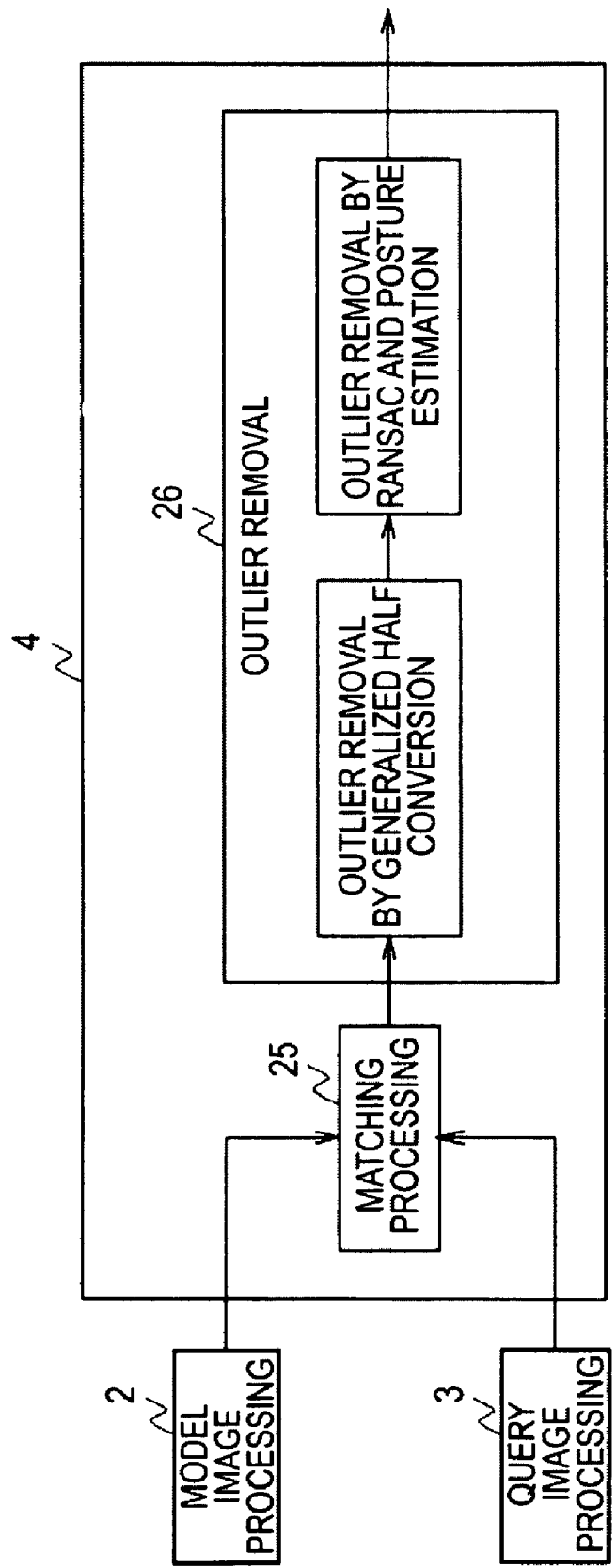
FIG. 18 is a block diagram showing a matching unit.

FIG. 18 is a block diagram showing the configuration of the matching unit 4 in detail. In the matching unit 4, a matching processing unit 25 detects the feature points having high similarity from among the feature points subject to the matching processing in the query image for each feature point set by the matching processing using the feature quantity of the feature point set obtained from the model image processing unit 2. The combinations of the feature point set and the feature points with high similarity in the query image are hereinafter called matching pairs. In regard to the matching processing, for example, the KNN method is applied.

Basically, a matching processing unit 25 sequentially selects the feature points subject to the matching processing in the query image. On an assumption that the selected feature point corresponds to the base point of the feature point set, the matching processing unit 25 searches the feature point corresponding to the support point of the feature point set from the feature points subject to the matching processing. The matching processing unit 25 compares the feature quantities of the feature points corresponding to the base point and the support point with the feature point set, and calculates the similarity with respect to the feature point, which is assumed as the base point.

The matching processing unit 25 executes this processing for each combination of the query images having different resolutions and the model image, and detects a matching pair of each feature point set for each combination of the query images having different resolutions and the model image.

Figure 19A:
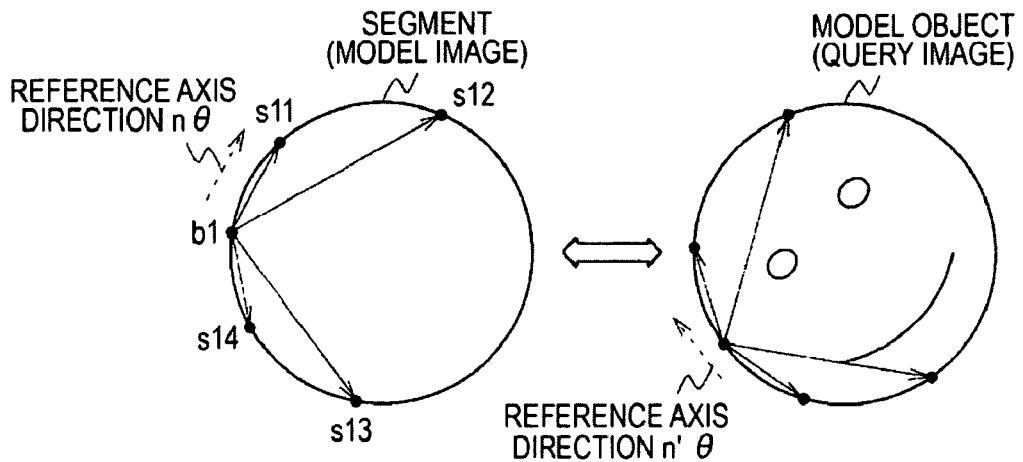
FIGS. 19A to 19C are schematic views illustrating a matching processing.
Figure 19B:
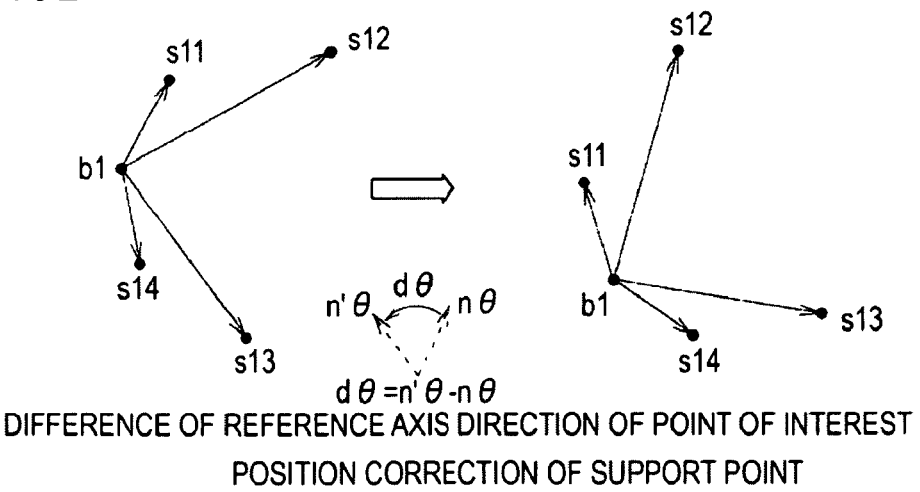

As shown in FIG. 19A, it is assumed that the matching processing unit 25 detects the similarity of the feature point Q in the query image with respect to a feature point set including a base point b1 and support points s11 to s14 in the model image. In this case, as shown in FIG. 19B, the matching processing unit 25 inclines the feature point set centering on the base point b1 on the basis of the reference axis directions nθ and n'θ, which are detected at the base point b1 and the feature point Q at the time of rotation normalization, respectively, such that the reference axis direction of the base point b1 is aligned with the reference axis direction of the feature point Q. In this way, the matching processing unit 25 corrects the positions of the support points s11 to s14 so as to correspond to the inclination of the model object in the query image.

Figure 19C:
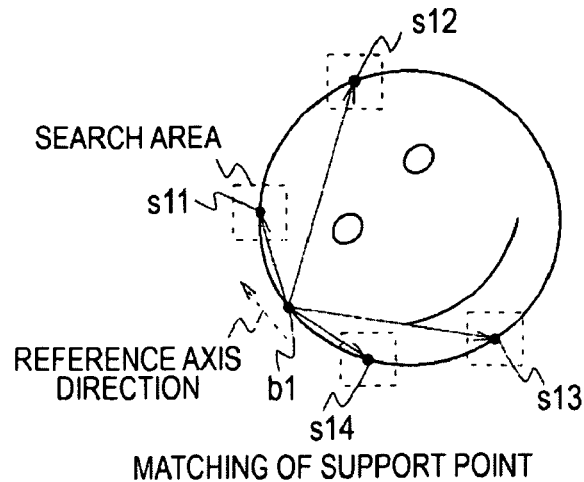

As shown in FIG. 19C, the matching processing unit 25 arranges the feature point set in the query image such that the base point b1 is aligned with the feature point Q, and sets a search area within a predetermined range centering on each of the support points s11 to s14. The matching processing unit 25 searches a feature point, which is expected to correspond to each of the support points s11 to s14, within the corresponding search range. The search of the feature point expected to correspond to each of the support points s11 to s14 within the corresponding search range absorbs an error in the reference axis direction for use in the position correction of the support point, and addresses distortion in the query image.

The feature point search is executed, for example, by detection of the feature point having a minimum feature quantity cost between the support point and the feature points included in the corresponding search range. The feature quantity cost is represented by the distance d(m,t) between the feature quantities of feature points m and t to be compared. In this case, m and t are the support point m and the feature point t. Specifically, let the feature quantity of the support point m be hm(k) and the feature quantity of the feature point t in the search area be ht(k), then, the distance d(m,t) between feature quantities is expressed by Equation (5).

$$d(m, t) = \frac{1}{2} \sum \frac{[hm(k) - ht(k)]^2}{hm(k) + ht(k)} \quad (5)$$

The similarity of the feature point Q with respect to the feature point set is expressed by using the distance d(b1,p') between the base point b1 and the corresponding feature point Q (Q=p') and the distance d(s1j,p'k) between the support point s1j and the corresponding feature point p'k, as expressed by Equation (6).

$$\text{Cost}(b1, p') = \frac{1}{1 + d(b1, p')} + \sum \frac{\alpha 1 j \beta 1 j}{1 + d(s1j, p'k)} \quad (6)$$

For Equation (6), α1j and β1j are the penalty cost of the angle and the distance, respectively, and are expressed by Equation (7). θp'k and rp'k are the angle and the distance, respectively, of the feature point p'k, which has the minimum distance d (the most matching) with respect to each support point, from the base point bi.

$$\alpha 1 j = \frac{1}{1 + 0.1|\theta 1 j - \theta_{p'k}|},$$

$$\beta 1 j = \begin{cases} r1j/r_{p'k} & \text{if } r1j/r_{p'k} < 1 \\ r_{p'k}/r1j & \text{otherwise} \end{cases} \quad (7)$$

The matching processing unit 25 detects the similarity of the feature point Q between each feature point set and all the feature points subject to the matching processing for each combination of the model image having different resolutions and the query image. The matching processing unit 25 also detects the feature point having the highest similarity from the similarities detected from the respective feature point sets for each combination of the model image having different resolutions and the query image, and sets the detected feature point as the matching pair of the corresponding feature point set. In this case, with respect to the combination having similarity of a predetermined value or less may not be set as a matching pair.

The matching pairs detected by the matching processing unit 25 are detected on the basis of the feature quantities of the local areas expressed by the base point and the support point. For this reason, a large number of outliers are included in the matching pairs.

The matching unit 4 removes the outliers from the matching pairs detected by the matching processing unit 25 through an outlier removal unit 26 (FIG. 18), thereby improving accuracy.

When the same model object is included in the model image and the query image, and matching pairs are correctly set in the model object, the matching pairs satisfy geometric constraints expressed by Equation (8).

$$\theta = \tan^{-1}\left(\frac{my}{mx}\right) \quad (8)$$
$$r = \text{sqrt}(mx^2 + my^2)$$
$$dx = tx - r * \cos(\theta + d\theta)$$
$$dy = ty - r * \sin(\theta + d\theta)$$

For Equation (8), mx and my denote the base point coordinate on the model image, tx and ty denote the coordinate of the feature point on the corresponding query image, dθ denotes the relative angle between the base point and the feature point, and dx and dy denote the shift amount of the corresponding feature point in the x direction and the y direction with respect to the base point, respectively. The matching pairs against the constraint condition are called outliers.

As shown in FIG. 20, the outlier removal unit 26 rotates the base point of each matching pair by using the operation expression of Equation (8) by the angle dθ to execute rotation normalization. Referring to FIG. 20, ti and mi are the feature point and the base point of the matching pair. The outlier removal unit 26 calculates a difference ti–m'i between the coordinate of the base point after rotation normalization and the coordinate of the corresponding feature point to calculate the shift amount dx and dy. The outlier removal unit 26 votes the calculated shift amount in the corresponding Bin of a two-dimensional space (dx–dy) prepared in advance.

The outlier removal unit 26 executes this processing for all the matching pairs, and detects the Bin with the largest voted value in the two-dimensional space (dx–dy). The matching pairs that do not have the shift amount (dx,dy) corresponding to the detected Bin are removed from the matching pairs as the outliers.

In the example of FIG. 20, therefore, t1–m'1, t2–m'2, and t3–m'3 have the same shift amount and are voted in the same Bin of the two-dimensional space. However, t4–m'4 is voted in a different Bin of the two-dimensional space, and the matching pairs based on t4 and m4 are excluded as the outliers.

Specifically, the outlier removal unit 26 sequentially executes outlier removal by generalized half conversion, outlier removal by RANSAC, and posture estimation to remove the outliers.

[Determination Processing]

FIG. 21 is a block diagram showing the determination unit 5 in detail. In this embodiment, matching pairs are detected by the matching processing unit 25 for each combination of the query images having different resolutions and the model image. In the determination unit 5, a primary determination unit 31 determines the number of matching pairs with reference to a predetermined threshold value, and detects the combination of the query images and the model images with the number of matching pairs equal to or more than the predetermined threshold value.

The combination with the number of matching pairs equal to or more than the predetermined threshold value is referred to as the combination of the model image and the query image with a model object of the substantially same size. Therefore, when this combination is detected, it can be determined that the model object is included in the query image.

In this embodiment, however, it may be expected that a matching pair is detected from the background of the model image. Accordingly, a lot of false-positive occurs, and accuracy may be deteriorated only by the processing of the primary determination unit 31.

In the determination unit 5, a model image reprocessing unit 32 sets the model image in the combination detected by the primary determination unit 31 as a processing target, sets a feature point, like the feature quantity description unit 24, and detects the feature quantity of the feature point.

Figure 22:
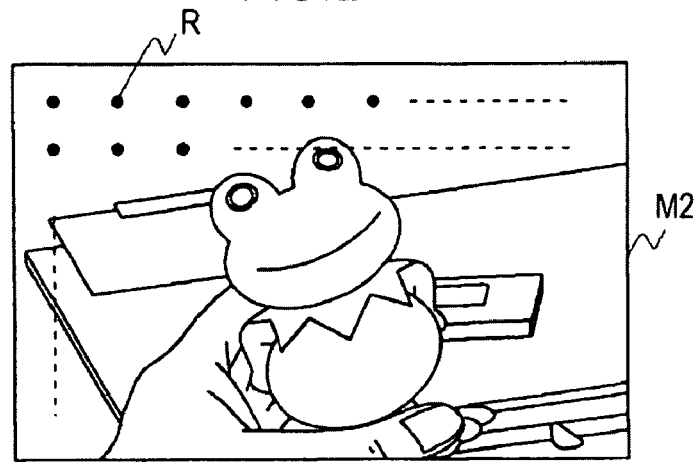
FIG. 22 is a schematic view illustrating feature point setting in a model image reprocessing unit.

That is, the model image reprocessing unit 32 sets all the pixels of the model image in the combination detected by the primary determination unit 31 as feature points, or as shown in FIG. 22, sets feature points R with pitches corresponding to a predetermined number of pixels in the horizontal direction and the vertical direction. For each of the feature points R, like the feature quantity description unit 24, model image reprocessing unit 32 detects the feature quantity using the segment boundary or edge information. In the model image reprocessing unit 32, like the feature quantity description unit 24, the feature points on the edge may be selected from among the feature points densely set and set as the feature points subject to the matching processing.

The query image reprocessing unit 33 sets the query image in the combination detected by the primary determination unit 31 as a processing target, and sets the feature points of the query image corresponding to the base point and the support point of the feature point set constituting the matching pair as the base point and the support point, thereby setting the feature point set in the query image. The query image reprocessing unit 33 also detects the feature quantities of the base point and the support point.

In this way, in the determination unit 5, in a state where the processing target is narrowed by the determination result of the primary determination unit 31, contrary to the model image processing unit 2 and the query image processing unit 3, the feature points and the feature point sets are set in the model image and the query image.

Like the matching processing unit 25, a back matching processing unit 34 executes the matching processing using the feature points and the feature point sets in the model image and the query image to detect the matching pairs. In the back matching processing unit 34, the outlier removal processing may be executed.

A check unit 35 checks whether or not each of the feature points of the matching pair detected by the back matching processing unit 34 has the coordinate near the base point of a corresponding feature point pair detected by the matching processing unit 25. In this way, the check unit 35 checks whether or not each of the feature points of the matching pair detected by the back matching processing unit 34 returns to the original base point, and excludes the feature points, which do not return to the original base point, from the processing target. Therefore, the determination unit 5 excludes a matching pair detected, for example, from the background from the processing target.

A secondary determination unit 36 determines the number of matching pairs, which are obtained through the check unit 35, with reference to a predetermined threshold value, and when the number of matching pairs is equal to or more than the threshold value, outputs the determination result that the model object is included in the query image.

Operation of Embodiment

With the above-described configuration, in this embodiment, natural images are set as the query image and the model image, and with respect to a model object in the model image, presence/absence of a model object in the query image is detected. With respect to this processing, for example, when object recognition is performed by matching using the local feature quantity of the model object, as described in JP-A-2004-326693, if the number of texture components in the model object is small, accuracy is deteriorated.

In this embodiment, with the application of the method described in JP-A-2008-077626, the base point and the support point supporting the base point are set in the model image, and object recognition is performed on the basis of the feature quantity of the feature point set including the base point and the support point. Therefore, in this embodiment, when the number of texture components in the model object is small, even if the model object is hidden in the query image, accuracy can be prevented from being deteriorated.

However, when a natural image is used as the model image, if the feature points are simply set in the model image to set the feature point set, the base point and the support point may be set across the background and the model object. In this case, the recognition accuracy may be deteriorated.

Figure 23:
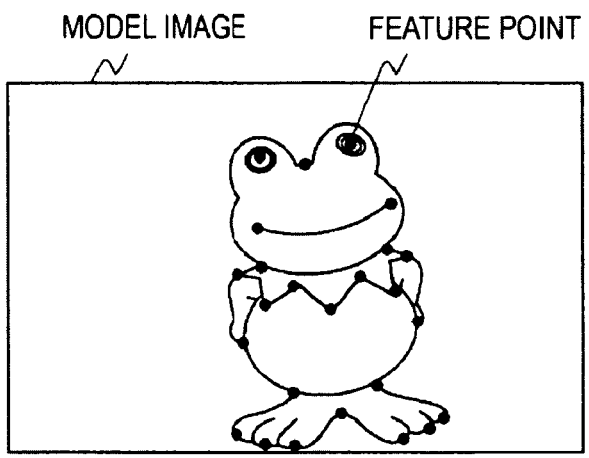
FIG. 23 is a schematic view illustrating feature point setting when a background is uniform.
Figure 24:
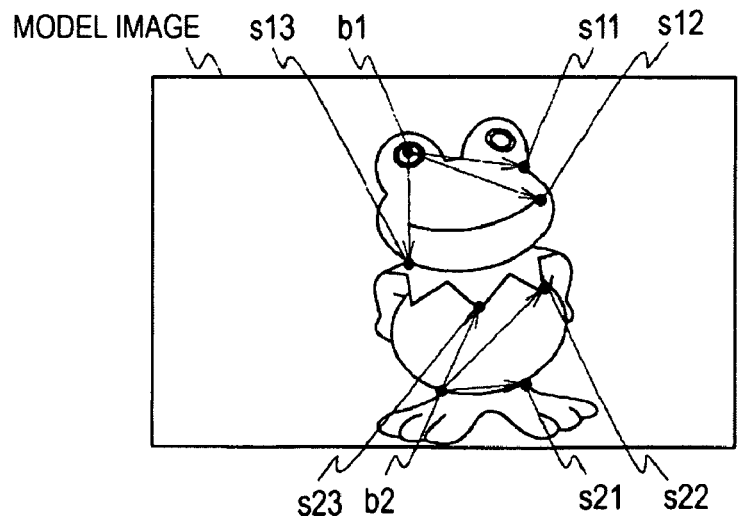
FIG. 24 is a schematic view illustrating setting of a feature point set when a background is uniform.

That is, as shown in FIG. 23, when the background of the model image is uniform, the local feature quantity of the model image is detected, and the feature points are detected only on the model object. Therefore, in the setting the base point and the support point based on these feature points, as shown in FIG. 24, base points b1 and b2 and support points s11 to s13 and s21 to s23 are set on the model object. Therefore, the feature quantity of the feature point set correctly expresses the feature quantity of the model object by the base points b1 and b2 and the support points s11 to s13 and s21 to s23.

Figure 25:
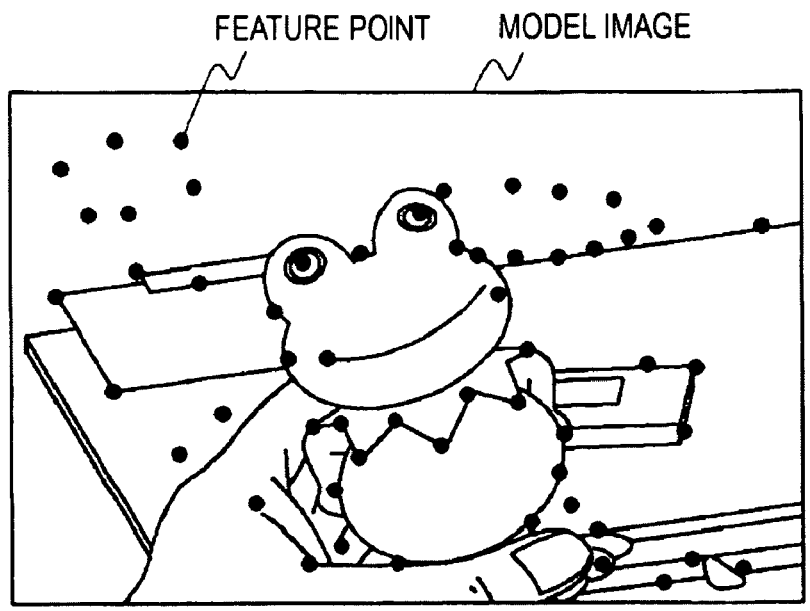
FIG. 25 is a schematic view illustrating feature point setting when a background is present.
Figure 26:
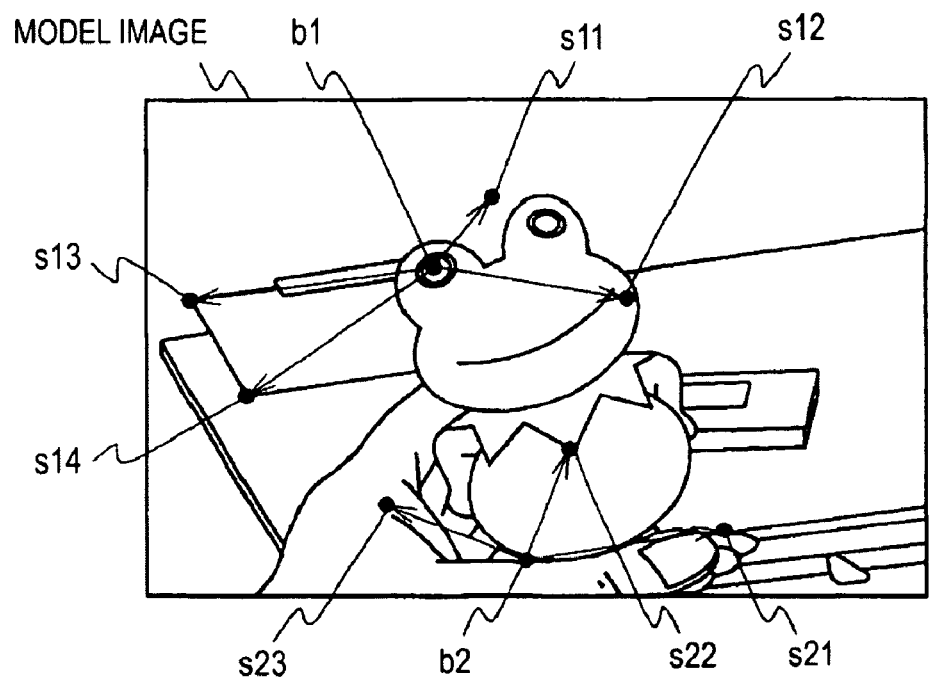
FIG. 26 is a schematic view illustrating setting of a feature point set when a background is present.

As shown in FIG. 25, however, when a background is caught in the model image, the feature points are detected from the background. As a result, as shown in FIG. 26, base points b1 and b2 and the support points s11 to s14 and s21 to s23 are set across the background and the model object. In this case, the feature quantity of the feature point set based on the base points b1 and b2 and the support points s11 to s14 and s21 to s23 also expresses the feature quantity of the background, and thus the recognition accuracy may be deteriorated.

This embodiment is configured such that the base points and the support points are not set across the background and the model object, thereby preventing the recognition accuracy from being deteriorated.

That is, in the object recognition device 1 (FIG. 2), a model image that is a natural image selected by the user is input to the model image processing unit 2. In the model image processing unit 2 (FIG. 2), the multi-resolution unit 12 generates model images in a pyramid structure with the image size expanded and reduced sequentially and gradually from the model image. The segmentation unit 13 segments the model images having different resolutions, such that the model image of each resolution is segmented.

In the object recognition device 1, the feature point extraction unit 14 sets the feature points for each segment and detects the feature quantity of each of the feature points. The feature point set decision unit 15 sets the feature points as the base point and the support point for each segment (FIGS. 11A to 11C). Therefore, in this embodiment, for each segment, the base point and the support point are set in the same segment to set the feature point set.

When the model image is segmented, it can be said that there is no case where the background and the model object are segmented in the same segment. The background and the model object may be segmented in the same segment, but it can be said that this occurs in few model objects.

Therefore, in this embodiment, the feature point set can be set for each segment such that the base point and the support point are not set across the background and the model object, and thus the recognition accuracy can be prevented from being deteriorated.

In particular, in this embodiment, segmentation in the segmentation unit 13 is color segmentation, and in the case of color segmentation, segmentation of the background and the model object in the same segment can be reliably reduced with a simple processing. Therefore, it can be reliably configured such that the base point and the support point are not set across the background and the model object, and thus the recognition accuracy can be prevented from being deteriorated.

Specifically, the feature point extraction unit 14 sets the feature points P at the segment boundary of the model image and detects the local feature quantity of each of the feature points P (FIG. 3). The feature points P are set with predetermined pitches or randomly such that, as the area or the peripheral length of the segment becomes small, the number of feature points decreases. Therefore, in this embodiment, as the area and the peripheral length of the segment become small, the number of feature point sets decreases. When the segment area is small and the peripheral length of the segment is small, even if the number of feature point sets increases, it does not sufficiently contribute to the improvement of the recognition accuracy, and the operation processing becomes complicated. For this reason, in this embodiment, as the area and the peripheral length of the segment become small, the number of feature point sets decreases. As a result, the processing can be simplified while accuracy deterioration can be suppressed.

For each feature point, the feature quantity description center O is set at a position displaced inward of the segment (FIG. 3), and a predetermined range centering on the description center O is set as the local area of the feature point. Therefore, in this embodiment, the local feature quantity can be described so as not to include information about the background, and thus accuracy can be effectively prevented from being deteriorated due to the background.

Any one of the feature point and the description center may be set in advance. When the description center is set in advance, each segment is shrunk to set the area for setting of the description center (FIG. 4). In this case, according to this embodiment, the segment is thinned, and the thinned area is superimposed on the shrunk area to set the area for setting of the description center (FIGS. 5 and 6). After the description center is set on the outer circumference of the area for setting of the description center, the feature point is set from the description center. Therefore, in this embodiment, with respect to a narrow part that is removed by shrink, the feature points can be set, and thus the biased distribution of the feature points can be suppressed. As a result, accuracy can be prevented from being deteriorated due to the biased distribution of the feature points.

In this embodiment, the feature points which are set in each segment in such a manner are set as the base point and the support point supporting the base point to set the feature point set in the model image (FIGS. 11A to 11C). During this processing, in this embodiment, as the area and the peripheral length of the segment decreases, the number of support points constituting one feature point set decreases. Therefore, the processing can be simplified while accuracy deterioration can be suppressed.

With respect to the model image, the feature quantity of each feature point set is described on the basis of the geometric positional relationship between the base point and the support points and the feature quantities of the base point and the support points (FIG. 12). The feature quantity of each feature point set is input to the matching unit 4 (FIG. 18).

Figures 15, 16:
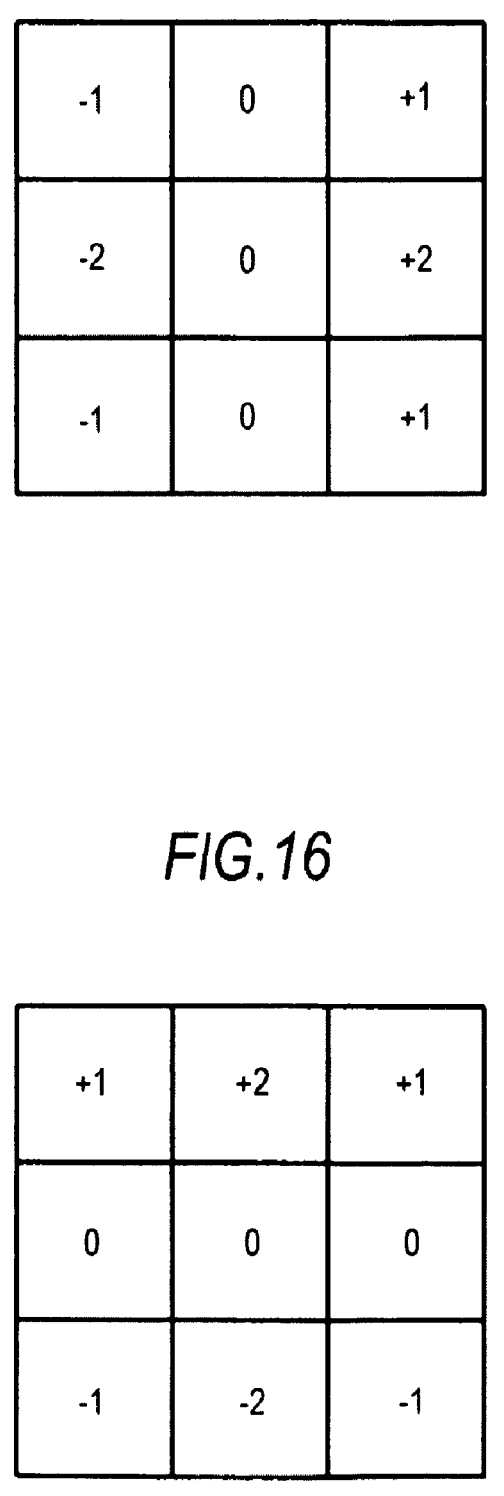

Meanwhile, with respect to the query image (FIG. 13), the multi-resolution unit 22 generates the query images in a pyramid structure with the image size expanded and reduced sequentially and gradually, similarly to the model image. The edge extraction unit 23 executes the edge detection processing, sets the feature points densely, and detects the feature quantity of each of the feature points (FIGS. 14 to 16). Specifically, with respect to the query image, all the pixels are set as the feature points or the feature points Q are set with pitches corresponding to a predetermined number of pixels (FIG. 17), and the feature quantity of each of the feature points is detected on the basis of edge information.

The matching unit 4 detects the feature points corresponding to the base points and the support point of the feature point set in the model image from among the feature points in the query image (FIG. 18), and executes the matching processing.

That is, the feature points in the query image are set sequentially as the processing target for each feature point set of the model image, and the search area is set in a part corresponding to each of the support points of the feature point set (FIGS. 19A to 19C). In each search area, the feature point that is the most similar to the corresponding support point is detected. With respect to the query image, the distance based on the feature quantity with the angle and the distance as the penalty cost is calculated between the feature point as the processing target and the feature point, which is the most similar to the support point, and the feature point set, and the similarity of the corresponding feature point with respect to the feature point set is calculated.

The similarity of each of the feature points in the query image is calculated with respect to all the feature points of one feature point set of the model image, and the feature point having the largest similarity from among the calculated similarities is set as the matching pair of the corresponding feature point set. The matching pair of the feature point set is obtained for all the feature point sets.

However, the matching pairs that are obtained in such a manner inevitably include mismatching pairs. For this reason, in this embodiment, the outlier removal unit 26 removes the mismatching pairs from the matching pairs by using the geometric relationship between the feature point sets (FIG. 20). The number of final matching pairs is determined by the determination unit 5 to determine presence/absence of the model object.

Even if the outliers are removed in such a manner, however, it may be expected that the matching pairs are formed with the feature point set in the background. For this reason, in this embodiment, the processing result of the outlier removal unit 26 is primarily determined by the primary determination unit 31 (FIG. 21), and the combination of the model image and the query image with specific resolution, in which a predetermined number of matching pairs or more are detected, is detected. With respect to the combination of the model image and the query image with specific resolution, the model image reprocessing unit 32 sets the feature points densely in the model image and detects the feature quantity of each of the feature points (FIG. 22), and the query image reprocessing unit 33 sets the feature point sets in the query image. The back matching processing unit 34 executes the back matching processing by the feature points and the feature point sets, and detects the matching pairs again. The check unit 35 checks whether or not the matching pairs detected again correspond to the matching pairs for the primary determination. This determination result is determined by the secondary determination unit, and the final determination result is obtained.

Through a series of steps related to the back matching processing, the object recognition device 1 can exclude the matching pairs by the background from the determination target, thereby preventing the recognition accuracy from being deteriorated due to the background.

Advantages of Embodiment

With the above-described configuration, after the model image is segmented, the base point and the corresponding support point are set in the same segment. Therefore, even if a background is caught in the model image, accuracy deterioration can be suppressed.

The base point and the support point are set at the segment boundary to set the feature point sets. Therefore, the base point and the corresponding support point can be set in the same segment specifically from the model, and even if a background is caught in the model image, accuracy deterioration can be suppressed.

The number of feature point sets constituting one segment is set on the basis of the area and/or the peripheral length of the segment. Therefore, the processing can be simplified while accuracy deterioration can be suppressed.

The number of support points constituting one feature point set is set on the basis of the area and/or the peripheral length of the segment. Therefore, the processing can be simplified while accuracy deterioration can be suppressed.

The base point is set at the segment boundary, and the feature quantity description center of the base point is set at the position displaced inward of the segment from the base point. Therefore, the feature quantity can be detected while reducing the influence of the background, and accuracy can be prevented from being deteriorated due to the background.

When the area which is formed by shrink of the segment is superimposed on the area which is formed by thinning of the segment to set the area for setting of the feature quantity description center, and the feature quantity description center is set on the outer circumference of the area for setting of the feature quantity description center. Therefore, the biased distribution of the feature points can be prevented, and accuracy can be improved.

With respect to the query image, the feature points are set densely for all the pixels or with pitches corresponding to a predetermined number of pixels, and the feature quantity of each of the feature points is detected. Therefore, with the application to the matching processing by comparison with the feature point set, a model object can be reliably detected from a query image with a background or the like.

After the processing result of the matching processing is primarily determined, the feature point set is set in the processing-target image on the basis of the determination result, the feature points are set densely in the model image, and the back matching processing is executed for the secondary determination. Therefore, the recognition accuracy can be further improved.

Second Embodiment

In this embodiment, the model image processing and the query image processing in the object recognition device 1 of the above-described embodiment are transposed. That is, in this embodiment, the query image is segmented and feature point sets are set in the segmented query image. The feature points are set densely in the model image. The feature point sets and the feature points are subject to the matching processing, and the processing result is primarily determined. In addition, the feature point set is set in the model image on the basis of the primary determination result, and the feature points are set densely in the query image. Then, the back matching processing and the secondary determination processing are executed.

Like this embodiment, even if the model image processing and the query image processing are transposed, the same advantages as the foregoing embodiment can be obtained.

Third Embodiment

In this embodiment, in the query image processing in the object recognition device of the above-described first embodiment or the model image processing in the object recognition device of the second embodiment, segmentation is executed, and the feature quantity of the feature point is detected by the segment boundary, rather than the edge boundary. The feature points are set densely, and only the feature points at the segment boundary are selectively set as a target subject to the matching processing.

Like this embodiment, even if segmentation is applied to the query image processing or the model image processing, the same advantages as the above-described embodiments can be obtained.

Fourth Embodiment

Figure 27:
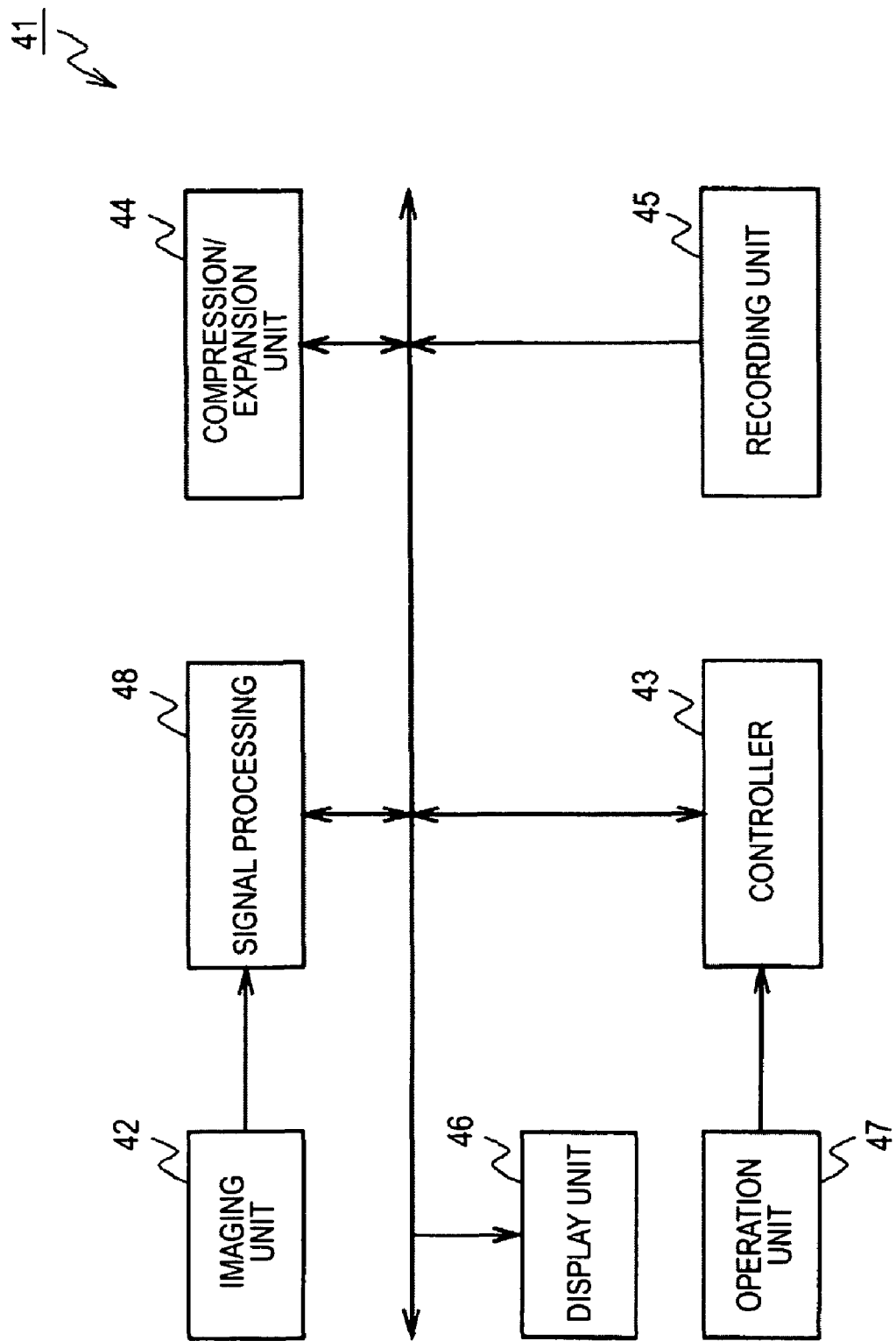
FIG. 27 is a block diagram showing a digital camera according to a fourth embodiment of the invention.

FIG. 27 is a block diagram showing a digital camera according to a fourth embodiment of the invention. In a digital camera 41, an imaging unit 42 includes an imaging element, an optical system forming an optical image on a light-receiving surface of the imaging element, and the like. The imaging unit 42 acquires and outputs the imaging result under the control of the controller 43. A signal processing unit 48 processes the imaging result output from the imaging unit 42 under control of a controller 43 to generate image data, and outputs image data to a bus BUS. A compression and expansion unit 44 compresses image data output to the bus BUS under the control of the controller 43 to output coded data, or expands coded data output to the bus BUS to output image data.

A recording unit 45 records and retains therein coded data output to the bus BUS under the control of the controller 43 or reproduces and outputs coded data retained to the bus BUS. A display unit 46 displays image data output to the bus BUS, various menu screens, and the like under the control of the controller 43. An operation unit 47 includes an operator provided in the digital camera 41, a touch panel provided on a display screen of the display unit 46, and the like, and notifies the user's operation to the controller 43.

The controller 43 is control means that controls the operation of the digital camera 41, and controls the operations of the respective units by execution of a program recorded in a memory (not shown). With this control, if the user operates a shutter button and instructs to acquire the imaging result, the controller 43 controls the imaging unit 42, the signal processing unit 48, and the display unit 46 to acquire the imaging result and to display the acquired imaging result on the display unit 46. If the user instructs to record the imaging result, the controller 43 controls the compression and expansion unit 44 to compress image data displayed on the display unit 46, to generate coded data, and to record coded data in the recording unit 45.

Meanwhile, if the user instructs to display a menu screen, the controller 43 controls the display unit 46 to display the menu screen. Then, if the user selects a menu on the menu screen and instructs to display the imaging result recorded in the recording unit 45, coded data recorded in the recording unit 45 is sequentially reproduced and expanded by the compression and expansion unit 44, and resultant image data is displayed on the display unit 46.

Figure 28:
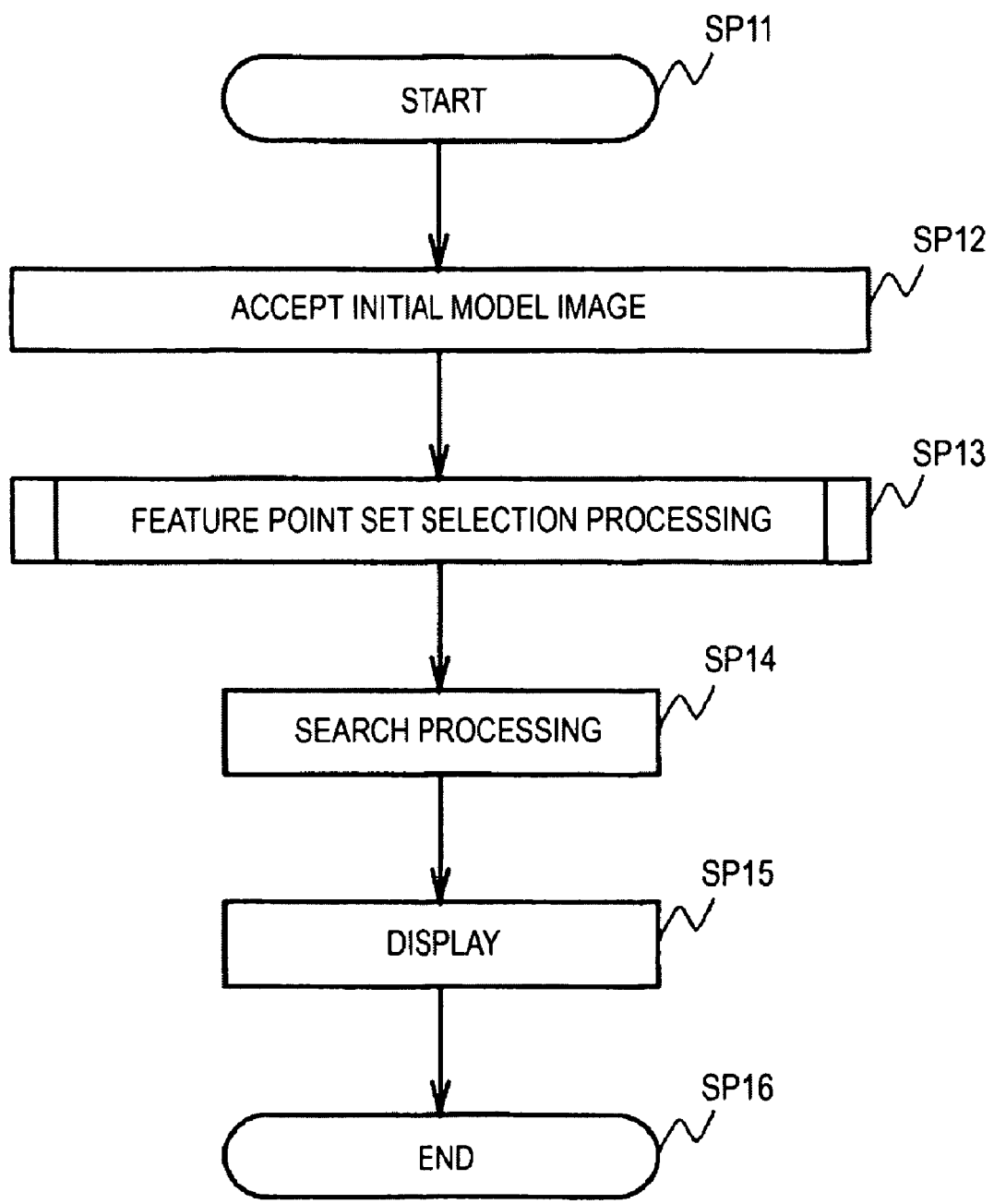
FIG. 28 is a flowchart showing a processing sequence of a controller in the digital camera of FIG. 27.

If the user instructs to search an imaging result, the processing sequence of FIG. 28 is executed to search the imaging result of a model object instructed by the user from among the imaging results recorded in the recording unit 45.

Figure 29:
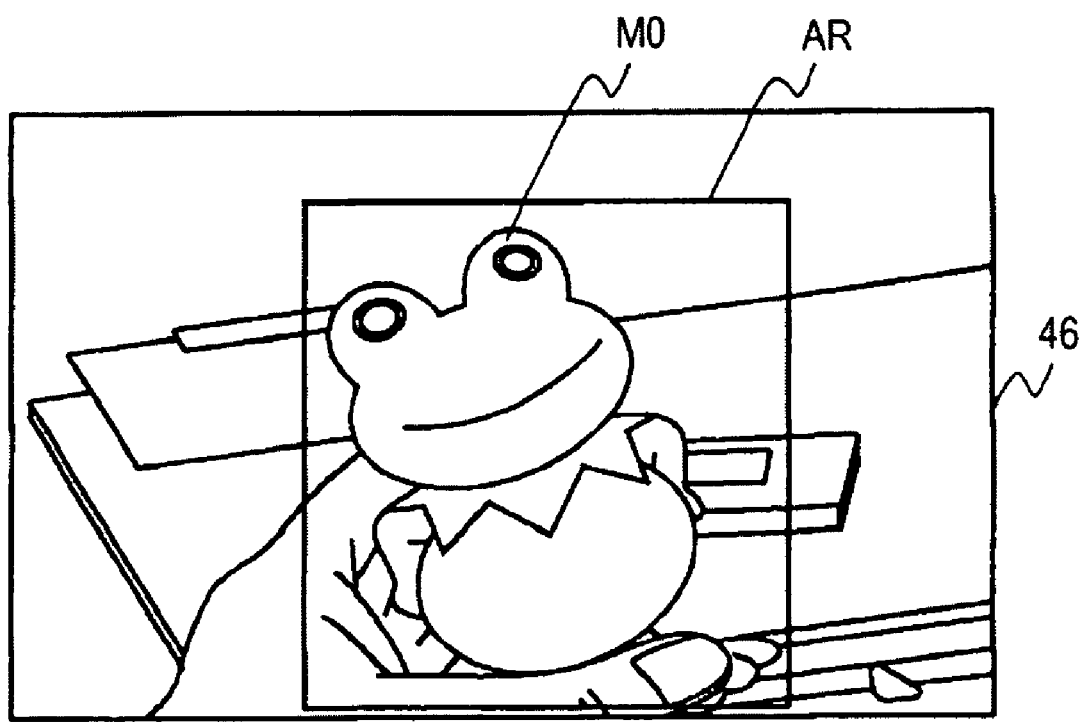
FIG. 29 is a schematic view illustrating a processing sequence of FIG. 28.

That is, if the processing sequence starts, the controller 43 progresses from Step SP11 to Step SP12. In Step SP12, the controller 43 accepts selection of a model image. Hereinafter, the model image accepted in Step SP12 is called an initial model image. Specifically, the controller 43 sequentially reads out the imaging results recorded in the recording unit 45, controls the compression and expansion unit 44 to execute data expansion, and controls the display unit 46 to display the list of the imaging results. On the list display, selection of a search-target image is accepted by an operation of a touch panel, and as shown in FIG. 29, the list display of the display unit 46 is switched to display of a search-target image. On the display of the display unit 46, setting of an area AR with a model object MO is accepted by an operation of the touch panel. The controller 43 selectively records image data of the area AR in a memory (not shown) to cut out an image of the area AR and to set the cut image as the initial model image. The controller 43 cuts out the image of the area AR and sets the cut image as the initial model image, thereby preventing detection accuracy from being deteriorated due to a background or other objects captured together with the model object.

Next, the controller 43 progresses to Step SP13 to execute a feature point set selection processing. The feature point set selection processing is to select a feature point set, which is significant for detection of the model object MO, and the details thereof will be described below.

Next, the controller 43 progresses to Step SP14, sequentially sets the imaging results recorded in the recording unit 45 as the processing target, executes the matching processing with the initial model image, and detects the imaging result with the model object MO. During this processing, the controller 43 sets the feature point set selected through Step SP13 in the initial model image or the query image, instead of setting of the feature point set in the model image processing unit 2 or the determination unit 5 (see FIGS. 1 and 2), and executes the matching processing by the method described above in connection with the first, second, or third embodiment.

If the matching processing is completed for all of the imaging results recorded in the recording unit 45, the controller 43 progresses to Step SP15, and controls the display unit 46 to display a list of imaging results with the model object MO. Thereafter, the controller 43 progresses to Step SP16, and ends the processing sequence.

[Feature Point Set Selection Processing]

Figure 30:
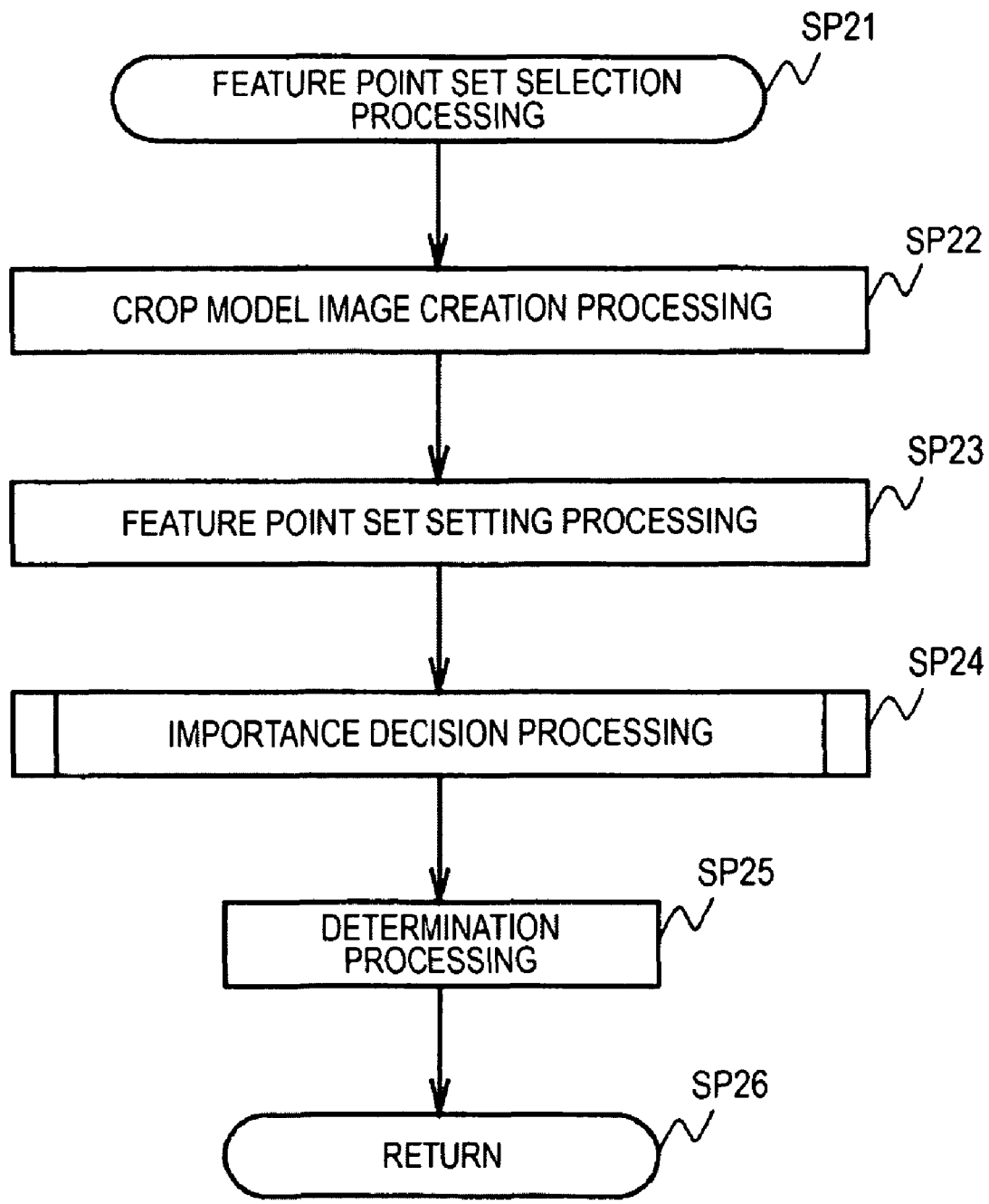
FIG. 30 is a flowchart showing a feature point set selection processing in the processing sequence of FIG. 28 in detail.

FIG. 30 is a flowchart showing the feature point set selection processing (Step SP13) of FIG. 28 in detail. If this processing sequence starts, the controller 43 progresses from Step SP21 to Step SP22, and executes a crop model image creation processing to create a crop model image from the imaging results recorded in the recording unit 45.

Figure 31:
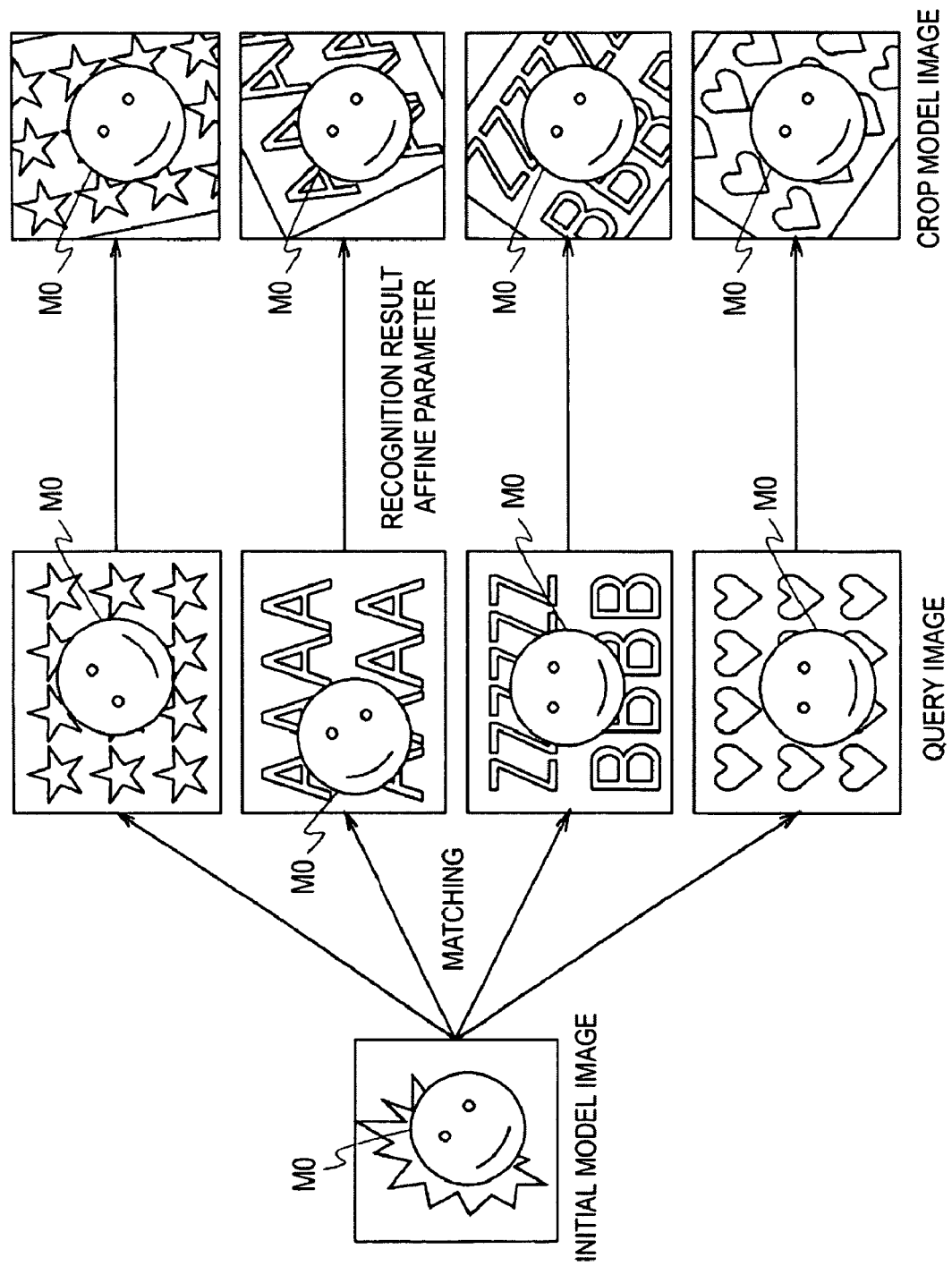
FIG. 31 is a schematic view illustrating a crop model image in the processing sequence of FIG. 30.

The crop model image is an image that is created from the imaging results recorded in the recording unit 45 and corresponds to the initial model image. The controller 43 sequentially selects the imaging results recorded in the recording unit 45, and executes the matching processing, which is described above in connection with the first to third embodiments, with the initial model image. The controller 43 detects a predetermined number of images, in which the model object MO is determined to be caught, by the matching processing, as shown in FIG. 31, and sets the detected images as the query image. The query image is an image that is a source of the crop model image. The controller 43 records and retains matching pairs that are detected by the matching processing when the query image is set.

The controller 43 detects the parameter for affine conversion (in FIG. 31, represented by affine parameter) from the coordinate of the base point constituting each of the matching pairs recorded and retained. The affine conversion is coordinate conversion of the coordinate of the base point on the query image into the coordinate of the corresponding base point on the initial model image. The affine conversion is performed for the corresponding query image on the basis of the detected parameter for affine conversion, and the area corresponding to the initial model image is cut out to create the crop model image. If the affine parameter is correctly obtained, the crop model image has the same image size as the initial model image. If the crop model image is superimposed on the initial model image, the model object MO of the crop model image is almost superimposed on the model object MO of the initial model image. In this way, in this embodiment, a feature point set is selected to improve the reliability of the matching processing.

Next, the controller 43 progresses to Step SP23, and sets the feature point set in each crop model image. The feature point set is set by the method described above in connection with the first embodiment.

Next, the controller 43 progresses to Step SP24, and executes an importance decision processing. The controller 43 sets the feature point set in the crop model image and the feature point set in the initial model image as a seed for a feature point set. Importance that represents significance with respect to detection of the model object MO is set in each seed for a feature point set.

Figure 32:
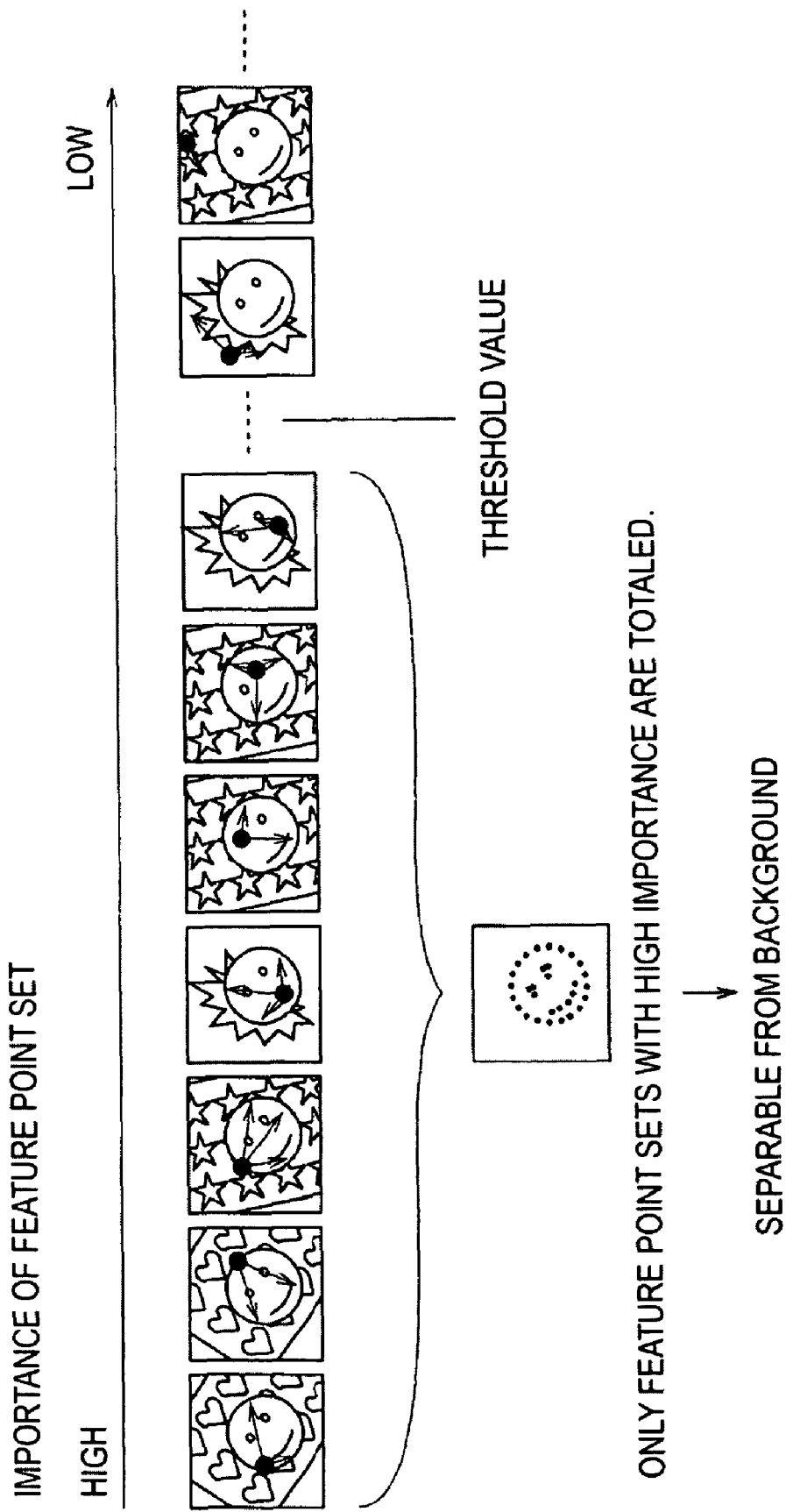
FIG. 32 is a schematic view illustrating selection based on importance in the processing sequence of FIG. 30.

Next, the controller 43 progresses to Step SP25, as shown in FIG. 32, determines the importance set in FIG. 14 with reference to a predetermined threshold value, and selects a feature point set with high importance from the seeds for a feature point set. Next, the controller 43 progresses to Step SP26, and returns to the original processing sequence. Then, the controller 43 executes a search processing of Step SP14 using the feature point set selected through Step SP25.

[Importance Decision Processing]

Figure 33:
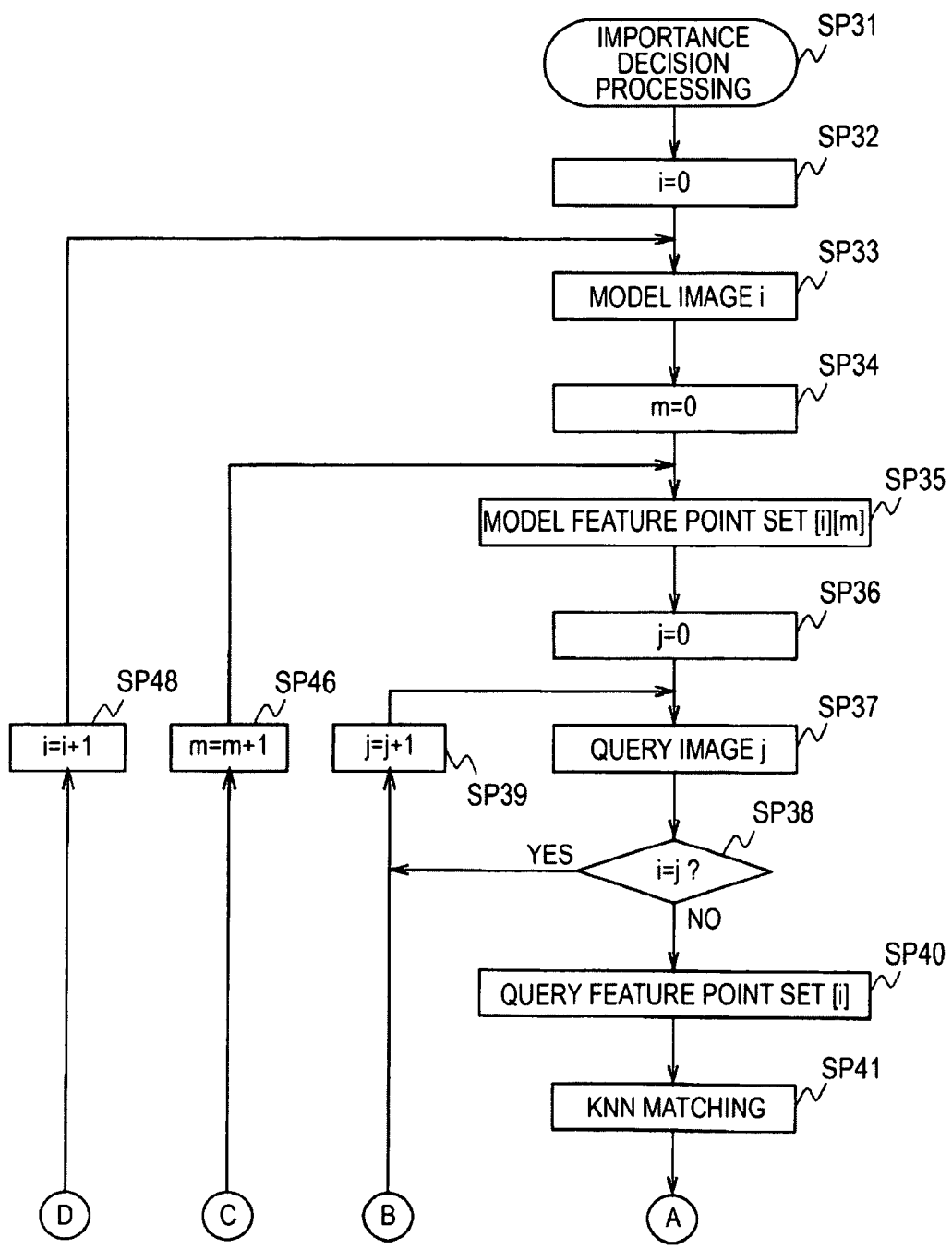
FIG. 33 is a flowchart showing an importance decision processing in the processing sequence of FIG. 30 in detail.
Figure 34:
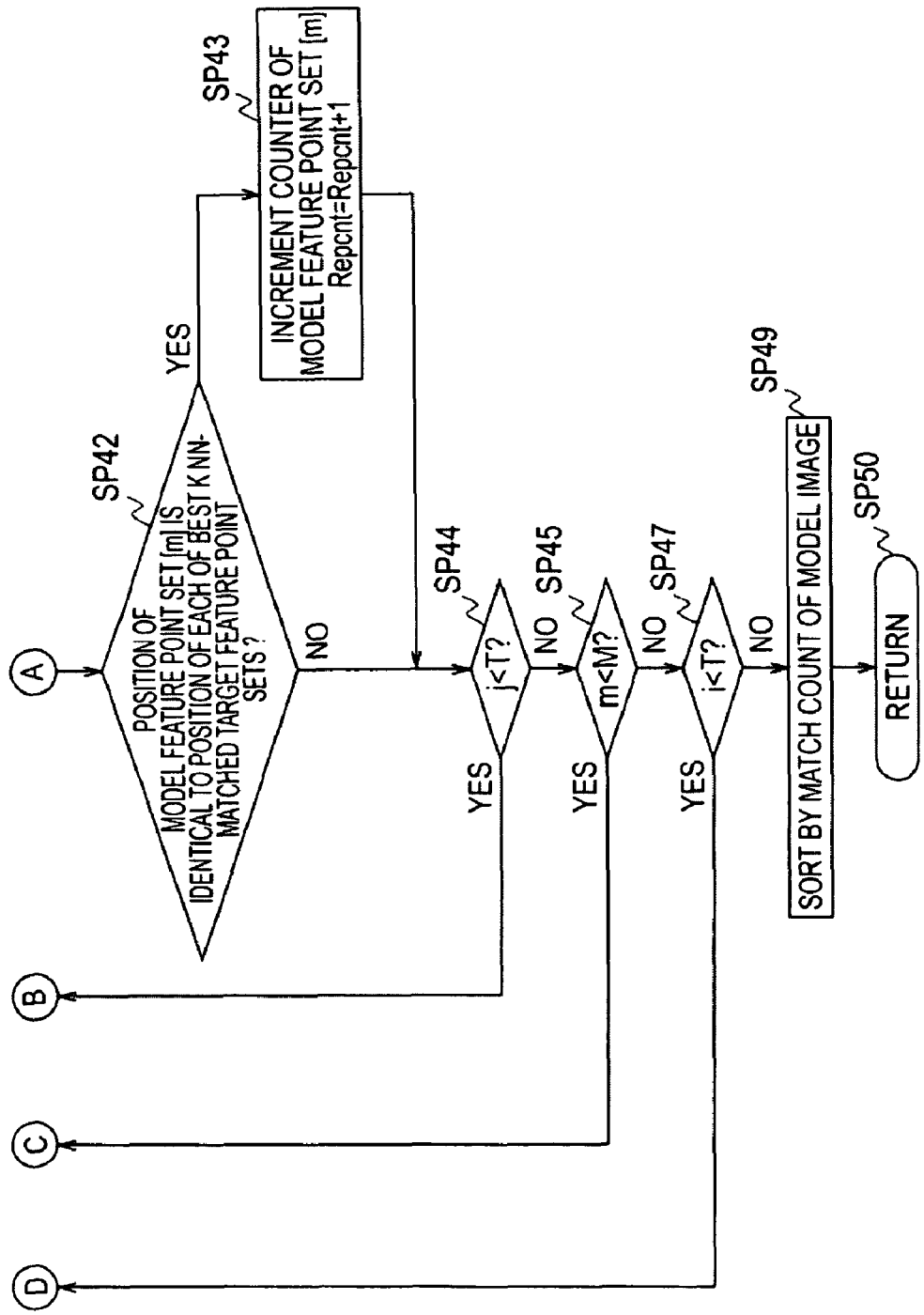
FIG. 34 is a flowchart following FIG. 30.

FIGS. 33 and 34 are flowcharts showing the importance decision processing in detail. If this processing sequence starts, the controller 43 progresses from Step SP31 to Step SP32, and initializes a variable i to a value 0. The variable i is a variable that is used to specify a feature point set selection-target from among the initial model image and the crop model images. Next, the controller 43 progresses to Step SP33, and selects the initial model image or the crop model image specified by the variable i.

Next, the controller 43 progresses to Step SP34, and initializes a variable m to a value 0. The variable m is a variable that is used to specify a selection-target feature point set from among the feature point sets in the model image selected through Step SP33. Next, the controller 43 progresses to Step SP35, and detects a feature point set specified by the variable m from the model image selected through Step SP33. In Step SP35, the controller 43 also resets the count value Repcnt of a counter and a distance sum, which will be described below and are related to the selection-target feature point set, to zero (0).

Next, the controller 43 progresses to Step SP36, and initializes a variable j to a value 0. The variable j is a variable that is used to specify a comparison target for importance detection from the initial model image and the crop model image. Next, in Step SP37, the controller 43 selects the initial model image or the crop model image specified by the variable j.

Next, the controller 43 progresses to Step SP38, and determines whether or not the variables i and j are identical. In this case, if a positive result is obtained, the controller 43 progresses from Step SP38 to Step SP39, increments the variable j by a value 1, and returns to Step SP37.

Meanwhile, if a negative result is obtained in Step SP38, the controller 43 progresses from Step SP38 to Step SP40. In this case, the controller 43 sets the feature points set in the image selected through Step SP37 as a comparison-target feature point set.

Next, in Step SP41, the controller 43 executes the matching processing between the comparison-target feature point sets and the selection-target feature point set selected through Step SP35, and detects similarity with respect to the selection-target feature point set for each comparison-target feature point set. The matching processing may be executed in various ways, and in this embodiment, the KNN method is applied to detect the similarity by the same processing as the foregoing embodiments.

Next, the controller 43 progresses to Step SP42 (FIG. 34), sorts the similarities detected through Step SP41, and selects K comparison-target feature point sets in a descending order of similarity. In addition, it is determined whether or not there is a feature point set, which has the coordinate of the base point identical to the coordinate of the base point in the selection-target feature point set, from among the selected feature point set. This determination is executed with a predetermined error.

In this case, if a positive result is obtained, the controller 43 progresses from Step SP42 to Step SP43, and increments the count value Repcnt of the counter related to the selection-target feature point set by a value 1. For the feature point set having the identical coordinate of the base point, a distance between the base points is calculated, and the distance is added to the distance sum. Then, the processing sequence progresses to Step SP44. Meanwhile, if a negative result is obtained in Step SP42, the controller 43 directly progresses from Step SP42 to Step SP44.

In Step SP44, the controller 43 determines whether or not the variable j is less than a predetermined value T, to thereby determine whether or not there is the initial model image or the crop model image which is not set as the comparison target yet. In this case, if a positive result is obtained, the controller 43 progresses from Step SP44 to Step SP39, increments the variable j, and returns to Step SP37.

Figure 35:
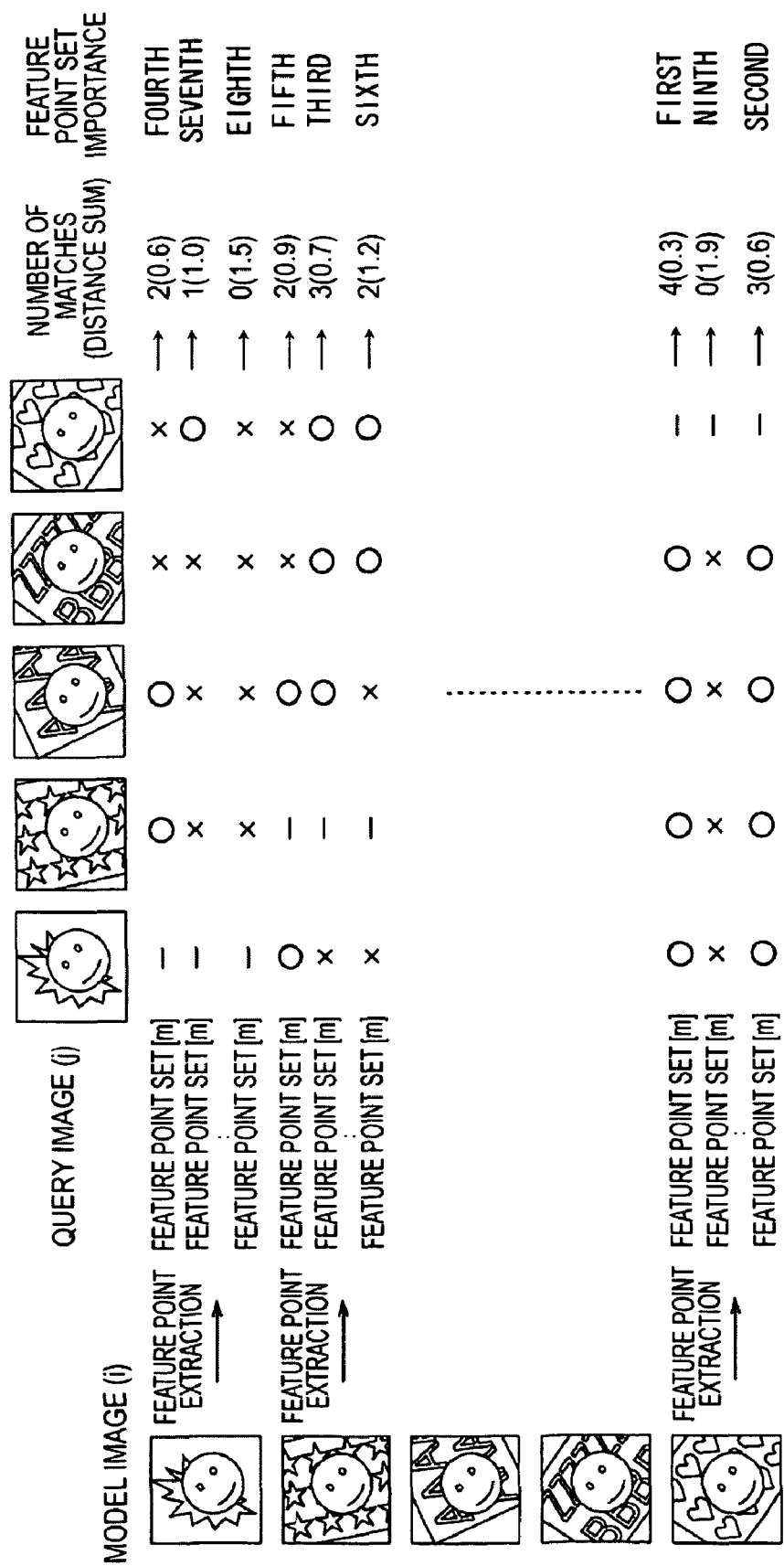
FIG. 35 is a schematic view illustrating the processing sequence of FIG. 33.
Figure 36A:
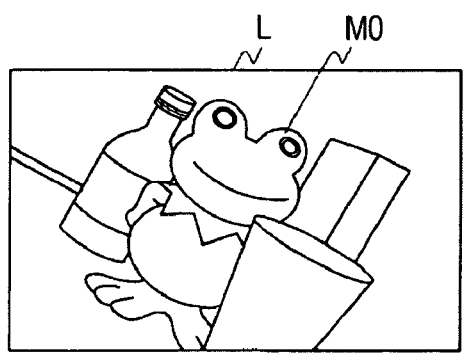
FIGS. 36A to 36C are schematic views illustrating the relationship between a model image and a processing-target image.
Figure 36B:
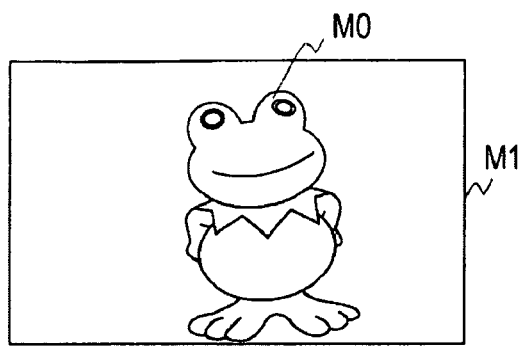
Figure 36C:
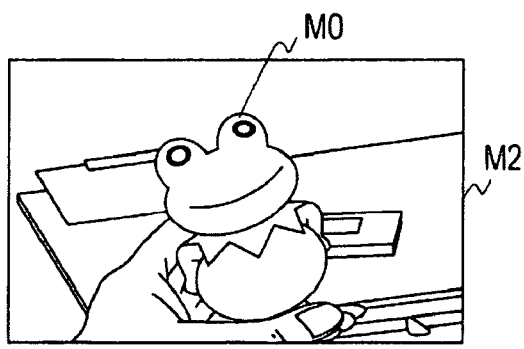

Therefore, the controller 43 sets one of the feature point sets in the initial model image and the crop model images as the selection target, and repeats the processing sequence of Steps SP37, SP38, SP39, SP40, SP41, SP42, SP44, SP39, and SP37, or Steps SP37, SP38, SP39, SP40, SP41, SP42, SP43, SP44, SP39, and SP37. As a result, as shown in FIG. 35, the controller 43 sequentially switches the comparison-target images, and detects the number of feature point set, which is matching to the selection-target feature point set, together with the distance sum.

If a negative result is obtained in Step SP44, the controller 43 progresses from Step SP44 to Step SP45. The controller 43 determines whether or not the variable m is less than a predetermined value M, to thereby determine whether or not there is a feature point set, which is not set as the selection target yet, in the initial model image or the crop model image as the selection target. In this case, if a positive result is obtained, the controller 43 progresses from Step SP45 to Step SP46, and increments the variable m. Next, the controller 43 returns to Step SP35, and switches the selection-target feature point set.

Meanwhile, if a negative result is obtained in Step SP45, the controller 43 progresses from Step SP45 to Step SP47. In this case, the controller 43 determines whether or not the variable i is less than a predetermined value T, to thereby determine whether or not there is the initial model image or the crop model image which is not set as the selection target yet. In this case, if a positive result is obtained, the controller 43 progresses from Step SP47 to Step SP48, and increments the variable i. Next, the controller 43 returns to Step SP33, and switches the selection-target image.

Meanwhile, if a negative result is obtained in Step SP47, the controller 43 progresses from Step SP47 to Step SP49. In this case, as shown in FIG. 35, the controller 43 sorts the count values Repcnt detected for the respective selection-target feature point sets in a descending order. When the count values Repcnt are identical, sorting is performed in an ascending order of the distance sum.

It can be said that an upper-level feature point set as the result of sorting is well matching to other model images, and is very likely to be a feature point set extracted from the model object. From this viewpoint, the controller 43 sets rankings in the sorting result, and in this embodiment, the ranking is set as the importance.

After Step SP49 is executed, the controller 43 progresses to Step SP50, and returns to the original processing sequence.

According to this embodiment, a feature point set that is significant for model object detection is selected in advance, and the matching processing is executed. Therefore, the matching processing can be executed with better efficiency and accuracy. As a result, the processing time can be significantly reduced. In addition, the recognition ratio can be prevented from being deteriorated due to false-positive caused by matching between backgrounds.

Even if the method in the foregoing embodiments is applied to crop image creation in the pre-processing, the recognition accuracy can be sufficiently improved.

Fifth Embodiment

In a digital camera of this embodiment, the importance decision processing in the fourth embodiment is simplified by effective use of segmentation when the feature point set is set in the initial model image or the crop model image. The digital camera of this embodiment has the same configuration as the digital camera 41 of the fourth embodiment, except for the configuration related to segmentation. Therefore, in the following description, reference is made to the configuration of FIG. 27.

In this embodiment, at the time of sorting in Step SP49 (FIG. 34), the controller 43 totals the count value Rpcnt for each segment. The totaling result is divided by the number of feature point sets of the corresponding segment. When the division value is small, it can be said that, even if the count value Rpcnt is large, the feature point sets of the corresponding segment are little likely to be the feature point set of the model object MO. Therefore, the controller 43 excludes the feature point sets of the segment with a small division value from a sorting target, and then executes sorting.

In this case, segment reliability is determined on the basis of the count value Rpcnt per feature point set, and the feature point sets of a segment, which is determined there is no model object, are finally excluded from the processing target. The determination of the segment reliability and exclusion from the processing target can be appropriately executed by the processing sequence in FIGS. 33 and 34, thereby simplifying the processing. Specifically, when matching is executed between the feature point set of the model image specified by the variable i and n (where n<T) query images specified by the variable j, the segment reliability may be determined in the same manner, and the feature point sets may be excluded in a subsequent processing.

To the contrary, when the division value is large, it can be said that, even if the count value Rpcnt is small, the feature point set of the corresponding segment are highly likely to be the feature point set of the model object MO. With respect to the feature point sets of the segment with a small division value, the division value may be weighted to the count value such that the feature point sets have higher rankings, as compared with a case where sorting is simply executed on the basis of the count value, and then sorting may be executed.

Instead of sorting for each feature point set, a feature point set may be selected in a segment unit on the basis of the division value.

In this embodiment, the same advantages as the fourth embodiment can be obtained by effective use of segmentation.

<Modifications>

In the fourth embodiment and the like, a case where a predetermined number of crop model images are processed has been described. However, the invention is not limited thereto, but the number of crop model images to be processed may vary, if necessary. Specifically, when the matching processing is executed between the feature point set of the initial model image and the n (where n<T) crop model images, and multiple feature point sets with the count value of n are detected, it can be determined that reliable feature point sets can be sufficiently detected. Therefore, in this case, when the number of crop model images is changed to n, the processing can be simplified. To the contrary, when the count value is small, the number of comparison-target crop model images increases, and thus reliability can be improved.

In the fourth and fifth embodiments, a case where an area with a model object is detected by area assignment of the user has been described. However, the invention is not limited thereto. For example, an area with a model object may be detected by application of face detection or the like.

In the fourth and fifth embodiments, a case where the invention is applied to the digital camera has been described. However, the invention is not limited thereto, and it can be widely applied to when a desired image is searched on Internet, or the like.

While in the foregoing embodiment, a case where the object recognition device is implemented by software has been described, the invention is not limited thereto, but it may be widely applied to when the object recognition device is implemented by hardware.

While in the foregoing embodiments, a case where a model object in a model image is detected from natural images, for example, a plural number of still images has been described, the invention is not limited thereto. For example, the invention can be widely applied to when a model object is detected from a motion image, when a desired subject is detected from an imaging result, or the like.

While in the foregoing embodiments, preferred configurations have been described, the invention is not limited to such configurations, but if necessary, the configurations may be combined.

The invention can be applied to when a still image of a specific subject is searched from among multiple still images recorded in a database.

The present application contains subject matter related to that disclosed in Japanese Priority Patent Applications JP 2008-161437 and JP 2008-300506 filed in Japan Patent Office on Jun. 20, 2008 and Nov. 26, 2008, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An object recognition device comprising:
    a model image processing unit processing a model image;
    a processing-target image processing unit possessing a processing-target image;
    a matching unit matching the processing results in the model image processing unit and the processing-target image processing unit; and
    a determination unit determining the processing result in the matching unit so as to determine presence/absence of a model object in the processing-target image,
    wherein the model image processing unit has a feature point set decision unit setting a feature point set including a base point and a support point supporting the base point in the model image, and detecting the feature quantity of the feature point set,
    the processing-target image processing unit has a feature point setting unit setting a feature point in the processing-target image and detecting the feature quantity of the feature point,
    the matching unit compares the feature quantity of the feature point set in the model image with the feature quantity of the feature point in the processing-target image so as to detect the feature point corresponding to the feature point set, and executes the matching,
    the model image processing unit has a segmentation unit segmenting the model image, and
    the feature point set decision unit sets the base point and the corresponding support point in the same segment for each segment of the model image so as to set the feature point set.

2. An object recognition device comprising:
    a model image processing unit processing a model image;
    a processing-target image processing unit processing a processing-target image;
    a matching unit matching the processing results in the model image processing unit and the processing-target image processing unit; and a determination unit determining the processing result in the matching unit so as to determine presence/absence of a model object in the processing-target image, wherein the processing-target image processing unit has a feature point set decision unit setting a feature point set including a base point and a support point supporting the base point in the processing-target image, and detecting the feature quantity of the feature point set, the model image processing unit has a feature point setting unit setting a feature point in the model image and detecting the feature quantity of the feature point, the matching unit compares the feature quantity of the feature point set in the processing-target image with the feature quantity of the feature point in the model image so as to detect the feature point corresponding to the feature point set, and executes the matching, the processing-target image processing unit has a segmentation unit segmenting the processing-target image, and the feature point set decision unit sets the base point and the corresponding support point in the same segment for each segment of the processing-target image so as to set the feature point set.

3. An object recognition method comprising the steps of:

processing a model image;

processing a processing-target image;

matching the processing results in the step of processing the model image and the step of processing the processing-target image; and determining the processing result in the step of matching so as to determine presence/absence of a model object in the processing-target image, wherein the step of processing the model image has a substep of setting a feature point set including a base point and a support point supporting the base point in the model image, and detecting the feature quantity of the feature point set, thereby deciding the feature point set, the step of processing the processing-target image has a substep of setting a feature point in the processing-target image and detecting the feature quantity of the feature point, in the step of matching, the feature point corresponding to the feature point set is detected by comparison of the feature quantity of the feature point set in the model image with the feature quantity of the feature point in the processing-target image, and the matching is executed, the step of processing the model image has a substep of segmenting the model image, and in the step of deciding the feature point set, the base point and the corresponding support point are set in the same segment for each segment of the model image so as to set the feature point set.

4. The method according to claim 3, wherein in the step of deciding the feature point set, the base point and the support point are set on a segment boundary.

5. The method according to claim 3, wherein in the step of deciding the feature point set, the number of feature point sets to be set in one segment is set on the basis of the area and peripheral length of the corresponding segment.

6. The method according to claim 3, wherein in the step of deciding the feature point set, the number of support points constituting one feature point set is set on the basis of the area and peripheral length of the corresponding segment.

7. The method according to claim 3, wherein the step of deciding the feature point set has a substep of setting the base point and/or the support point on a segment boundary, and setting the feature quantity description center of the base point and/or the support point at a position displaced inward of the corresponding segment from the base point and/or the support point, a local area of the base point and/or the support point is set with the feature quantity description center as a center, and the feature quantity of the base point and/or the support point is detected on the basis of the feature quantity of the local area so as to set the feature quantity of the feature point set.

8. The method according to claim 7, wherein the substep of setting the feature quantity description center has substeps of shrinking a processing-target segment to the size corresponding to the local area, thinning the processing-target segment, and superimposing an area generated in the step of shrinking on an area thinned in the step of thinning so as to set an area where the feature quantity description center is set, the feature quantity description center is set in the outer circumference of the area where the feature quantity description center is set, and in the step of deciding the feature point set, the base point and/or the support point is set on the basis of the feature quantity description center.

9. The method according to claim 3, wherein in the step of setting the feature point, all pixels of the processing-target image are set as feature points, or feature points are set in the processing-target image with pitches corresponding to a predetermined number of pixels, a local area is set for each feature point, and the feature quantity of the local area is detected, and in the step of matching, the feature point corresponding to the feature point set is detected by detection of the feature point corresponding to the base point and the support point of the feature point set in the model image, and the matching is executed.

10. The method according to claim 9, wherein in the step of setting the feature point, a feature point on the edge of the processing-target image is selected and set as a processing-target feature point of the step of matching.

11. The method according to claim 9, wherein the step of determining includes the substeps of determining the processing result in the step of matching so as to primarily determine presence/absence of a model object in the processing-target image, setting all pixels of the model image as feature points or setting feature points in the model image with pitches corresponding to a predetermined number of pixels in accordance with the determination result in the substep of primarily determining, and detecting the feature quantity of each feature point of the model image, thereby reprocessing the model image, setting the feature point set in the processing-target image in accordance with the determination result in the substep of primarily determining, thereby reprocessing the processing-target image, executing back matching by comparison of the feature quantity of the feature point set in the processing-target image by the step of reprocessing the processing-target image with the feature quantity of the feature point in the model image by the step of reprocessing the model image, and determining the processing result in the step of back matching so as to secondarily determine presence/absence of a model object in the processing-target image.

12. An object recognition method comprising the steps of:

processing a model image;

processing a processing-target image;

matching the processing results in the step of processing the model image and the step of processing the processing-target image; and determining the processing result in the step of matching so as to determine presence/absence of a model object in the processing-target image, wherein the step of processing the processing-target image has a substep of setting a feature point set including a base point and a support point supporting the base point in the processing-target image, and detecting the feature quantity of the feature point set, thereby deciding the feature point set, the step of processing the model image has a substep of setting a feature point in the model image and detecting the feature quantity of the feature point, in the step of matching, the feature point corresponding to the feature point set is detected by comparison of the feature quantity of the feature point set in the processing-target image and the feature quantity of the feature point in the model image, and the matching is executed, the step of processing the processing-target image has a substep of segmenting the processing-target image, and in the step of deciding the feature point set, the base point and the corresponding support point are set in the same segment for each segment of the processing-target image so as to set the feature point set.

13. The method according to claim 12, wherein in the step of deciding the feature point set, the base point and the support point are set on a segment boundary.

14. The method according to claim 12, wherein in the step of deciding the feature point set, the number of feature point sets to be set in one segment is set on the basis of the area and peripheral length of the corresponding segment.

15. The method according to claim 12, wherein in the step of deciding the feature point set, the number of support points constituting one feature point set is set on the basis of the area and peripheral length of the corresponding segment.

16. The method according to claim 12, wherein the step of deciding the feature point set has a substep of setting the base point on a segment boundary, and setting the feature quantity description center of the base point at a position displaced inward of the corresponding segment from the base point, a local area of the base point is set with the feature quantity description center as a center, and the feature quantity of the base point is detected on the basis of the feature quantity of the local area so as to set the feature quantity of the feature point set.

17. The method according to claim 16, wherein the substep of setting the feature quantity description center has substeps of shrinking a processing-target segment to the size corresponding to the local area, thinning the processing-target segment, and superimposing an area generated in the step of shrinking on an area thinned in the step of thinning so as to set an area where the feature quantity description center is set, the feature quantity description center is set in the outer circumference of the area where the feature quantity description center is set, and in the step of deciding the feature point set, the corresponding base point is set on the basis of the feature quantity description center.

18. The method according to claim 12, wherein in the step of setting the feature point, all pixels of the model image are set as feature points, or feature points are set in the model image with pitches corresponding to a predetermined number of pixels, a local area is set for each feature point, and the feature quantity of the local area is detected, and in the step of matching, the feature point corresponding to the feature point set is detected by detection of the feature point corresponding to the base point and the support point of the feature point set in the processing-target image, and the matching is executed.

19. The method according to claim 18, wherein in the step of setting the feature point, a feature point on the edge of the processing-target image is selected and set as a processing-target feature point of the step of matching.

20. The method according to claim 18, wherein the step of determining includes the substeps of determining the processing result in the step of matching so as to primarily determine presence/absence of a model object in the processing-target image, setting all pixels of the processing-target image as feature points or setting feature points in the processing-target image with pitches corresponding to a predetermined number of pixels in accordance with the determination result in the substep of primarily determining, and detecting the feature quantity of each feature point of the processing-target image, thereby reprocessing the processing-target image, setting the feature point set in the model image in accordance with the determination result in the substep of primarily determining, thereby reprocessing the model image, executing back matching by comparison of the feature quantity of the feature point set in the model image by the step of reprocessing the model image with the feature quantity of the feature point in the processing-target image by the step of reprocessing the processing-target image, and determining the processing result in the step of back matching so as to secondarily determine presence/absence of a model object in the processing-target image.

21. A non-transitory computer readable medium having a program stored thereon for an object recognition method that is executable by a computer, the program comprising the steps of:

processing a model image;

processing a processing-target image;

matching the processing results in the step of processing the model image and the step of processing the processing-target image; and determining the processing result in the step of matching so as to determine presence/absence of a model object in the processing-target image, wherein the step of processing the model image has a substep of setting a feature point set including a base point and a support point supporting the base point in the model image, and detecting the feature quantity of the feature point set, thereby deciding the feature point set, the step of processing the processing-target image has a substep of setting a feature point in the processing-target image and detecting the feature quantity of the feature point, in the step of matching, the feature point corresponding to the feature point set is detected by comparison of the feature quantity of the feature point set in the model image with the feature quantity of the feature point in the processing-target image, and the matching is executed, the step of processing the model image has a substep of segmenting the model image, and in the step of deciding the feature point set, the base point and the corresponding support point are set in the same segment for each segment of the model image so as to set the feature point set.

22. A non-transitory computer readable medium having a program stored thereon for an object recognition method that is executable by a computer, the program comprising the steps of:

processing a model image;

processing a processing-target image;

matching the processing results in the step of processing the model image and the step of processing the processing-target image; and determining the processing result in the step of matching so as to determine presence/absence of a model object in the processing-target image;

wherein the step of processing the processing-target image has a substep of setting a feature point set including a base point and a support point supporting the base point in the processing-target image, and detecting the feature quantity of the feature point set, thereby deciding the feature point set, the step of processing the model image has a substep of setting a feature point in the model image and detecting the feature quantity of the feature point, in the step of matching, the feature point corresponding to the feature point set is detected by comparison of the feature quantity of the feature point set in the processing-target image and the feature quantity of the feature point in the model image, and the matching is executed, the step of processing the processing-target image has a substep of segmenting the processing-target image, in the step of deciding the feature point set, the base point and the corresponding support point are set in the same segment for each segment of the processing-target image so as to set the feature point set.

23. A non-transitory recording medium having recorded thereon a program for an object recognition method, which is executable by a computer, the program comprising the steps of:

processing a model image;

processing a processing-target image;

matching the processing results in the step of processing the model image and the step of processing the processing-target image; and determining the processing result in the step of matching so as to determine presence/absence of a model object in the processing-target image, wherein the step of processing the model image has a substep of setting a feature point set including a base point and a support point supporting the base point in the model image, and detecting the feature quantity of the feature point set, thereby deciding the feature point set, the step of processing the processing-target image has a substep of setting a feature point in the processing-target image and detecting the feature quantity of the feature point, in the step of matching, the feature point corresponding to the feature point set is detected by comparison of the feature quantity of the feature point set in the model image with the feature quantity of the feature point in the processing-target image, and the matching is executed, the step of processing the model image has a substep of segmenting the model image, and in the step of deciding the feature point set, the base point and the corresponding support point are set in the same segment for each segment of the model image so as to set the feature point set.

24. A non-transitory recording medium having recorded thereon a program for an object recognition method, which is executable by a computer, the program comprising the steps of:

processing a model image;

processing a processing-target image;

matching the processing results in the step of processing the model image and the step of processing the processing-target image; and determining the processing result in the step of matching so as to determine presence/absence of a model object in the processing-target image, wherein the step of processing the processing-target image has a substep of setting a feature point set including a base point and a support point supporting the base point in the processing-target image, and detecting the feature quantity of the feature point set, thereby deciding the feature point set, the step of processing the model image has a substep of setting a feature point in the model image and detecting the feature quantity of the feature point, in the step of matching, the feature point corresponding to the feature point set is detected by comparison of the feature quantity of the feature point set in the processing-target image and the feature quantity of the feature point in the model image, and the matching is executed, the step of processing the processing-target image has a substep of segmenting the processing-target image, in the step of deciding the feature point set, the base point and the corresponding support point are set in the same segment for each segment of the processing-target image so as to set the feature point set.

* * * * *